United States Patent

Uchino et al.

(10) Patent No.: US 9,813,162 B2
(45) Date of Patent: Nov. 7, 2017

(54) OPTICAL TRANSMISSION CIRCUIT, OPTICAL TRANSMISSION DEVICE, AND OPTICAL TRANSMISSION SYSTEM

(71) Applicant: Sony Corporation, Tokyo (JP)

(72) Inventors: Koki Uchino, Tokyo (JP); Hideyuki Suzuki, Kanagawa (JP); Hiroshi Morita, Kanagawa (JP); Yoshifumi Miyajima, Kanagawa (JP); Masatsugu Sugano, Hokkaido (JP)

(73) Assignee: Sony Corporation, Tokyo (JP)

( * ) Notice: Subject to any disclaimer, the term of this patent is extended or adjusted under 35 U.S.C. 154(b) by 7 days.

(21) Appl. No.: 14/483,758

(22) Filed: Sep. 11, 2014

(65) Prior Publication Data

US 2015/0104190 A1 Apr. 16, 2015

(30) Foreign Application Priority Data

Oct. 11, 2013 (JP) ................................ 2013-213778

(51) Int. Cl.
*H04B 10/58* (2013.01)
*H04B 10/50* (2013.01)

(52) U.S. Cl.
CPC ........... *H04B 10/58* (2013.01); *H04B 10/504* (2013.01)

(58) Field of Classification Search
CPC .... H04B 10/504; H04B 10/58; H04B 10/564; H04B 10/69
USPC ......... 398/159, 194, 189, 192, 1, 139; 385/3
See application file for complete search history.

(56) References Cited

U.S. PATENT DOCUMENTS

| 2002/0027688 A1* | 3/2002 | Stephenson | H04B 10/077 398/139 |
| 2002/0093714 A1* | 7/2002 | Tokita | H04B 10/564 398/192 |
| 2003/0072339 A1* | 4/2003 | Bowler | H01S 5/042 372/38.02 |
| 2003/0103772 A1* | 6/2003 | Ishii | H04B 10/0779 398/197 |
| 2003/0198479 A1* | 10/2003 | Chujo | H04B 10/504 398/183 |

(Continued)

FOREIGN PATENT DOCUMENTS

JP 2012-243891 12/2012

*Primary Examiner* — David Payne
*Assistant Examiner* — Omar S Ismail
(74) *Attorney, Agent, or Firm* — Michael Best & Friedrich LLP

(57) ABSTRACT

A driving element which performs driving according to a level of a voltage signal to be transmitted optically, a modulation current driving circuit configured to supply a modulation current modulated by the driving element to a light source for optical communication configured to convert a current signal into light and to output the light, and a constant current supply circuit configured to supply a constant current to the light source for optical communication are included. Then, when the voltage signal is at a first level, the driving element is turned on and the modulation current driving circuit supplies the modulation current to the light source for optical communication. When the voltage signal is at a second level, the driving element is turned off and the modulation current driving circuit stops supplying the modulation current. The present technique can be applied, for example, to an optical transmission system.

15 Claims, 21 Drawing Sheets

(56) References Cited

U.S. PATENT DOCUMENTS

| | | | | |
|---|---|---|---|---|
| 2004/0027742 A1* | 2/2004 | Miller | ............... | H01L 27/0251 |
| | | | | 361/52 |
| 2005/0152703 A1* | 7/2005 | Ogawa | ............... | H04B 10/508 |
| | | | | 398/189 |
| 2005/0254743 A1* | 11/2005 | Akiyama | ............... | B82Y 20/00 |
| | | | | 385/3 |
| 2005/0276609 A1* | 12/2005 | Mizobuchi | ........... | H04B 10/504 |
| | | | | 398/135 |
| 2006/0088322 A1* | 4/2006 | Kobayashi | ........... | H04B 10/505 |
| | | | | 398/198 |
| 2008/0272952 A1* | 11/2008 | Wood | ............... | G04F 10/005 |
| | | | | 341/166 |
| 2009/0214198 A1* | 8/2009 | Takahashi | ........... | H01S 5/06825 |
| | | | | 398/1 |
| 2012/0200159 A1* | 8/2012 | Katagiri | .......... | H03K 19/00361 |
| | | | | 307/43 |
| 2013/0169256 A1* | 7/2013 | Cortigiani | .......... | H05B 33/0818 |
| | | | | 323/299 |
| 2013/0195133 A1* | 8/2013 | Moto | ............... | H01S 5/06233 |
| | | | | 372/38.02 |

* cited by examiner

FIG. 3A  DIFFERENTIAL VOLTAGE SIGNAL
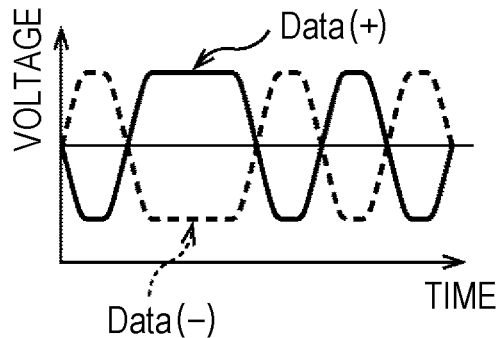
FIG. 3B  SINGLE-END CURRENT SIGNAL
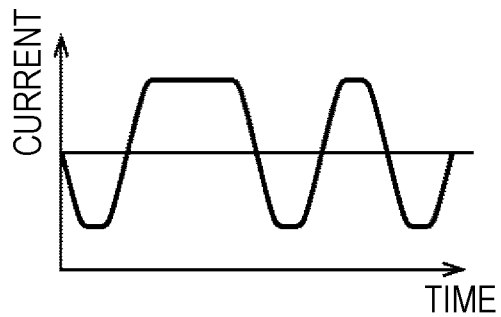
FIG. 3C  SINGLE-END OPTICAL SIGNAL
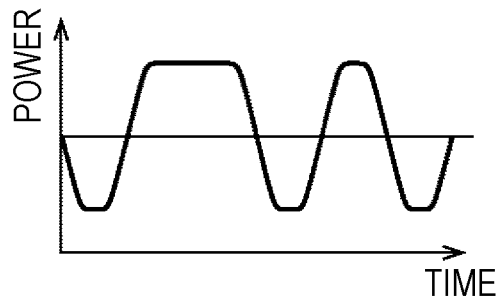

OPTICAL TRANSMISSION CIRCUIT, OPTICAL TRANSMISSION DEVICE, AND OPTICAL TRANSMISSION SYSTEM

CROSS REFERENCE TO RELATED APPLICATIONS

This application claims the benefit of Japanese Priority Patent Application JP 2013-213778 filed on Oct. 11, 2013, the entire contents of which are incorporated herein by reference.

TECHNICAL FIELD

The present disclosure relates to an optical transmission circuit, an optical transmission device, and an optical transmission system. Specifically, the present disclosure relates to an optical transmission circuit, an optical transmission device, and an optical transmission system which can control electric power consumption.

BACKGROUND ART

In the past, in an optical transmission system to transmit data with light, an optical transmission device optically converts an electric signal and transmits data. An optical reception device receives the data by electrically converting the light.

For example, in the optical transmission device, the electric signal output from a driving circuit is optically converted by an electro-optical conversion element and is transmitted through an optical fiber. Then, in the optical reception device, voltage-conversion is performed on a current signal, which is photoelectrically converted by a light receiving element (such as photo diode), by the optical reception circuit and amplitude of the signal is amplified and is supplied to a circuit in a subsequent stage.

Also, in the optical transmission device, as the electro-optical conversion element, a vertical cavity surface emitting laser (VCSEL) is used as a kind of a laser diode (LD) and as a light source for a short-wavelength light transceiver. Then, current is necessary to drive the vertical cavity surface emitting laser. Here, a bias current is applied to the vertical cavity surface emitting laser and a data signal is modulated by a modulation current, whereby a data string of 0 or 1 is output from the vertical cavity surface emitting laser. To drive such a vertical cavity surface emitting laser, a semiconductor laser driving circuit in which a push-pull-type differential driver circuit is used can be used (see, for example, PTL 1).

CITATION LIST

Patent Literature

[PTL 1]
JP 2012-243891 A

SUMMARY

Technical Problem

Incidentally, a current to drive the vertical cavity surface emitting laser is reflected in electric power consumption of the optical transmission device. The larger electric power becomes, the more heat is generated. Here, the vertical cavity surface emitting laser has a characteristic with which optical output power is decreased due to an influence of heat. Thus, it is concerned that heat generation due to the electric power consumption negatively influences the characteristic of the vertical cavity surface emitting laser and it is desired to control the electric power consumption.

The present disclosure has been made in view of such a circumstance and is to control electric power consumption.

Solution to Problem

An optical transmission circuit of an aspect of the present disclosure includes: a driving element configured to perform driving according to a level of a voltage signal to be transmitted optically; a modulation current driving circuit configured to supply a modulation current modulated by the driving element to a light source for optical communication configured to convert a current signal into light and to output the light; and a constant current supply circuit configured to supply a constant current to the light source for optical communication, wherein when the voltage signal is at a first level, the driving element is turned on and the modulation current driving circuit supplies the modulation current to the light source for optical communication, and when the voltage signal is at a second level, the driving element is turned off and the modulation current driving circuit stops supplying the modulation current.

An optical transmission device of an aspect of the present disclosure includes: an optical transmission circuit configured to convert a voltage signal to be transmitted optically into a current signal; and a light source for optical communication configured to convert the current signal supplied from the optical transmission circuit into light and to output the light, wherein the optical transmission circuit includes a driving element configured to perform driving according to a level of the voltage signal to be transmitted optically, a modulation current driving circuit configured to supply a modulation current modulated by the driving element to the light source for optical communication configured to convert a current signal into light and to output the light, and a constant current supply circuit configured to supply a constant current to the light source for optical communication, and wherein when the voltage signal is at a first level, the driving element is turned on and the modulation current driving circuit supplies the modulation current to the light source for optical communication, and when the voltage signal is at a second level, the driving element is turned off and the modulation current driving circuit stops supplying the modulation current.

An optical transmission system of an aspect of the present disclosure includes: an optical transmission device including an optical transmission circuit configured to convert a voltage signal to be transmitted optically into a current signal and a light source for optical communication configured to convert the current signal supplied from the optical transmission circuit into light and to output the light; and an optical reception device including a light receiving element configured to receive the optical signal through an optical transmission path and to output a current signal which is the optical signal being converted photoelectrically and an optical reception circuit configured to perform voltage conversion on the current signal output from the light receiving element, wherein the optical transmission circuit includes a driving element configured to perform driving according to a level of the voltage signal to be transmitted optically, a modulation current driving circuit configured to supply a modulation current modulated by the driving element to the light source for optical communication configured to convert a current signal into light and to output the light, and a constant current supply circuit configured to supply a constant current to the light source for optical communication, and wherein when the voltage signal is at a first level, the driving element is turned on and the modulation current driving circuit supplies the modulation current to the light source for optical communication, and when the voltage signal is at a second level, the driving element is turned off and the modulation current driving circuit stops supplying the modulation current.

In an aspect of the present disclosure, when the voltage signal is at a first level, the driving element is turned on and the modulation current driving circuit supplies the modulation current to the light source for optical communication. When the voltage signal is at a second level, the driving element is turned off and the modulation current driving circuit stops supplying the modulation current.

Advantageous Effects of Invention

According to an aspect of the present disclosure, electric power consumption can be controlled.

BRIEF DESCRIPTION OF DRAWINGS

FIG. 3A to FIG. 3C are views illustrating a current signal and a voltage signal in the optical transmission circuit.

DESCRIPTION OF EMBODIMENTS

In the following, specific embodiments to which the present technique is applied will be described in detail with reference to the drawings.

Figure 1:
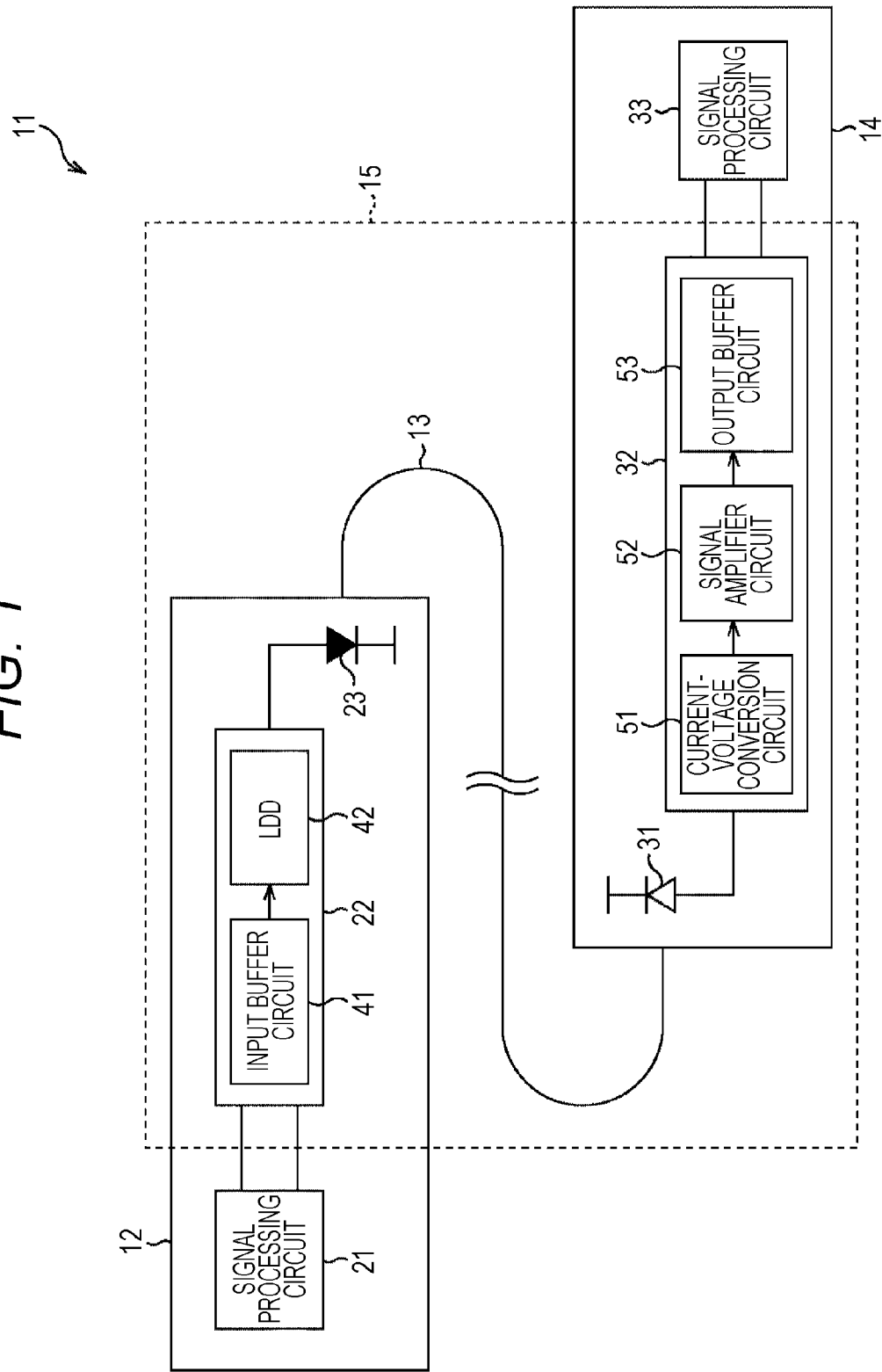
FIG. 1 is a diagram illustrating an example configuration of an embodiment of an optical transmission system to which the present technique is applied.

FIG. 1 is a diagram illustrating an example configuration of an embodiment of an optical transmission system to which the present technique is applied. In this specification, a system means an entire apparatus formed with more than one device.

As illustrated in FIG. 1, an optical transmission system 11 is configured by an optical transmission device 12 and an optical reception device 14 being connected to each other through an optical transmission path 13 such as an optical fiber. An optical signal is transmitted to the optical reception device 14 from the optical transmission device 12.

The optical transmission device 12 includes a signal processing circuit 21, an optical transmission circuit 22, and a light source for optical communication 23. The optical reception device 14 includes a light receiving element 31, an optical reception circuit 32, and a signal processing circuit 33. Also, in the optical transmission system 11 of such a configuration, an optical transmission module 15 is configured by the optical transmission path 13, the optical transmission circuit 22, the light source for optical communication 23, the light receiving element 31, and the optical reception circuit 32.

The signal processing circuit 21 performs signal processing to generate a signal corresponding to data to be transmitted optically and supplies, for example, a differential voltage signal including a pair of voltage signals of inverted phases to the optical transmission circuit 22.

The optical transmission circuit 22 includes an input buffer circuit 41 and a laser diode driver (LDD) 42. The optical transmission circuit 22 converts the differential voltage signal supplied from the signal processing circuit 21 into a current signal and supplies the converted signal to the light source for optical communication 23.

The light source for optical communication 23 transmits, through the optical transmission path 13, an optical signal which is the current signal supplied from the optical transmission circuit 22 and is converted into light. As the light source for optical communication 23, for example, a semiconductor laser such as a vertical cavity surface emitting laser (VCSEL) is used.

The light receiving element 31 receives, through the optical transmission path 13, the optical signal transmitted from the light source for optical communication 23 and performs photoelectric conversion. Then, the light receiving element 31 outputs a current signal corresponding to the optical signal.

The optical reception circuit 32 includes a current-voltage conversion circuit 51, a signal amplifier circuit 52, and an output buffer circuit 53. The optical reception circuit 32 supplies, to the signal processing circuit 33, a differential voltage signal which is the current signal which is output from the light receiving element 31 and on which voltage conversion is performed. That is, in the optical reception circuit 32, a current signal is converted into a voltage signal by the current-voltage conversion circuit 51. The voltage signal is amplified by the signal amplifier circuit 52 and is output to the signal processing circuit 33 from the output buffer circuit 53.

The signal processing circuit 33 performs signal processing on the differential voltage signal supplied from the optical reception circuit 32 and receives data transmitted optically from the optical transmission device 12.

Next, with reference to FIG. 2 and FIG. 3A to FIG. 3C, a circuit configuration of the optical transmission circuit 22 will be described.

Generally, in an interface of each of the signal processing circuit 21 and the optical transmission circuit 22, as means to transmit a signal at high speed, a differential transmission method to change voltage in a relatively short period of time by making signal amplitude into amplitude of a several hundred mV which is lower than a power supply voltage and to transmit a signal while making the signal differential in order to improve noise immunity is adopted. However, by a resistance component, an inductance component, a capacity component, or the like applied to an interface unit of each of the signal processing circuit 21 and the optical transmission circuit 22, amplitude may be attenuated and signal quality becomes easily deteriorated since amplitude is small.

Figure 2:
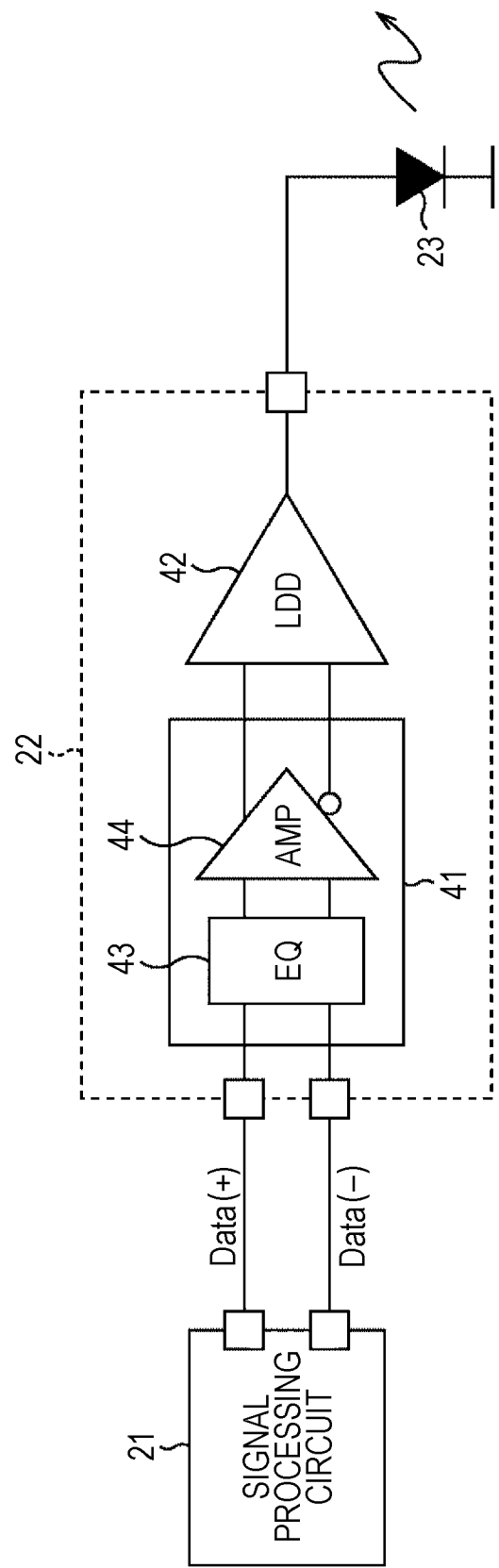
FIG. 2 is a view illustrating a circuit configuration of an optical transmission circuit.

Thus, as illustrated in FIG. 2, in the optical transmission circuit 22, an input buffer circuit 41 includes a waveform shaping circuit (EQ) 43 and an amplifier circuit (AMP) 44.

The waveform shaping circuit 43 is a circuit to keep signal quality. The waveform shaping circuit 43 performs waveform-shaping to supplement the attenuated signal supplied from the signal processing circuit 21 and supplies the signal to the amplifier circuit 44.

The amplifier circuit 44 is a circuit to amplify the signal, on which the waveform-shaping is performed by the waveform shaping circuit 43, to the power supply voltage and supplies the amplified signal to the LDD 42.

The LDD 42 converts the signal supplied from the amplifier circuit 44 into a current signal to drive the light source for optical communication 23 and supplies a driving current to the light source for optical communication 23.

The optical transmission circuit 22 is configured in such a manner. For example, when differential voltage signals Data (+) and Data (−) illustrated in FIG. 3A are supplied from the signal processing circuit 21, the optical transmission circuit 22 supplies, to the light source for optical communication 23, a single-end current signal illustrated in FIG. 3B. Thus, a single-end optical signal such as what is illustrated in FIG. 3C is output from the light source for optical communication 23. Then, in the light source for optical communication 23, an optical transmission waveform, which is converted into an optical signal and is transmitted optically, is converted into a current signal from the light by the light receiving element 31 of the optical reception device 14 through the optical transmission path 13 in FIG. 1. Then, in the optical reception circuit 32, conversion into a voltage signal is performed and signal processing is performed in the signal processing circuit 33. Incidentally, as described, to prevent the characteristic of the light source for optical communication 23 from being negatively influenced by heat generation due to electric power consumption, it is desired to control current consumption of the whole optical transmission circuit 22.

Figure 4:
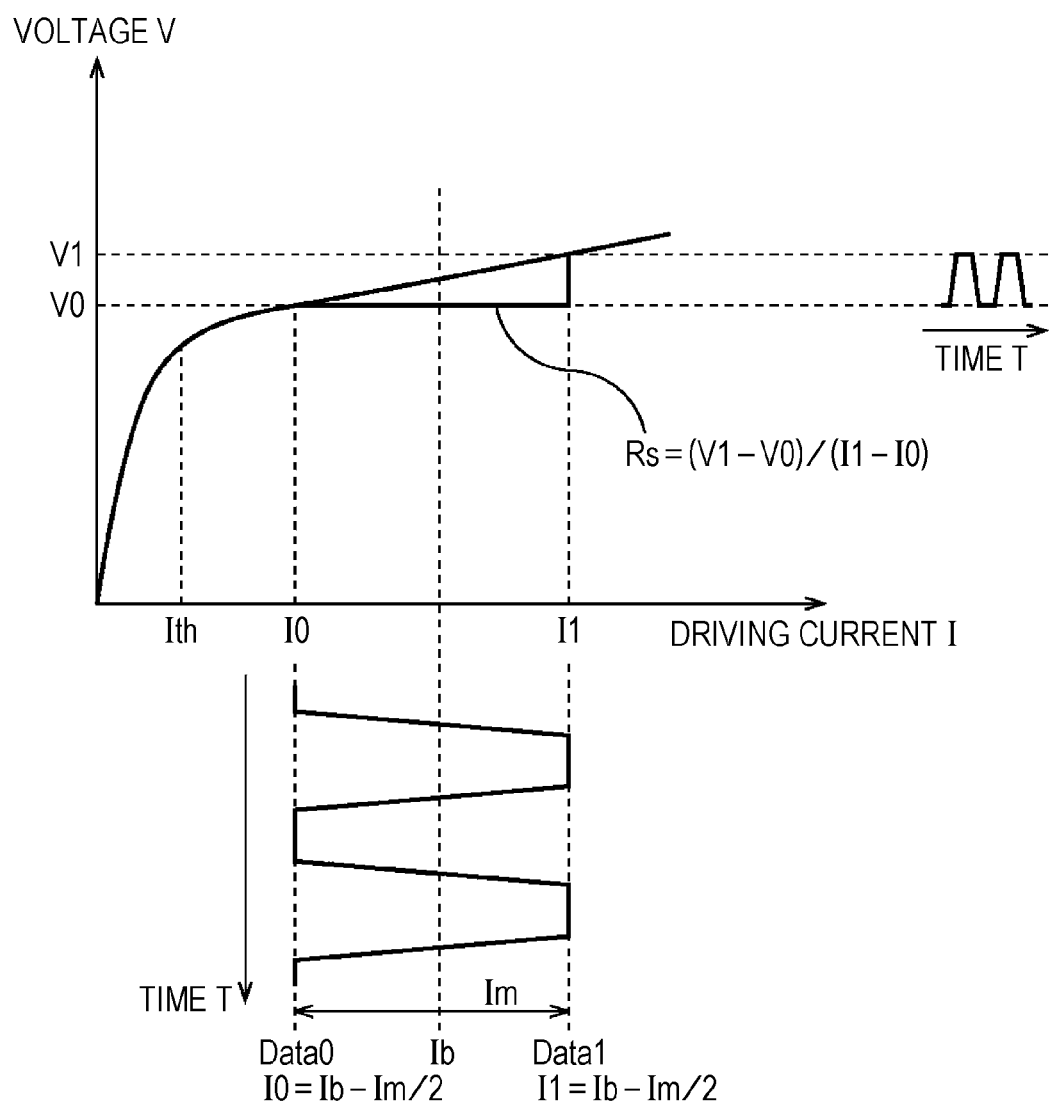
FIG. 4 is a view illustrating an I-V characteristic of a laser diode.

Here, in FIG. 4, an I-V characteristic which is one of important characteristics of the laser diode is illustrated.

A laser element expresses digital data by changing a driving current. Usually, a current I1 having a larger driving current is used as data Data1 and a current I0 having a smaller driving current is used as data Data0. Usually, an average current ((I0+I1)/2) between the current I1 and the current I0 is called a bias current Ib. A differential current (I1−I0) between the current I1 and the current I0 is called a modulation current Im. Also, a voltage V1 is an anode voltage of the laser diode when the current I1 is supplied. A voltage V0 is an anode voltage of the laser diode when the current I0 is supplied. Here, the laser diode has a differential resistance Rs such as what is illustrated in FIG. 4. Then, when a data transmission in which a balance of a DC component is kept is performed, the bias current Ib is the most preferable as an average current consumption of the driving current.

Figure 5:
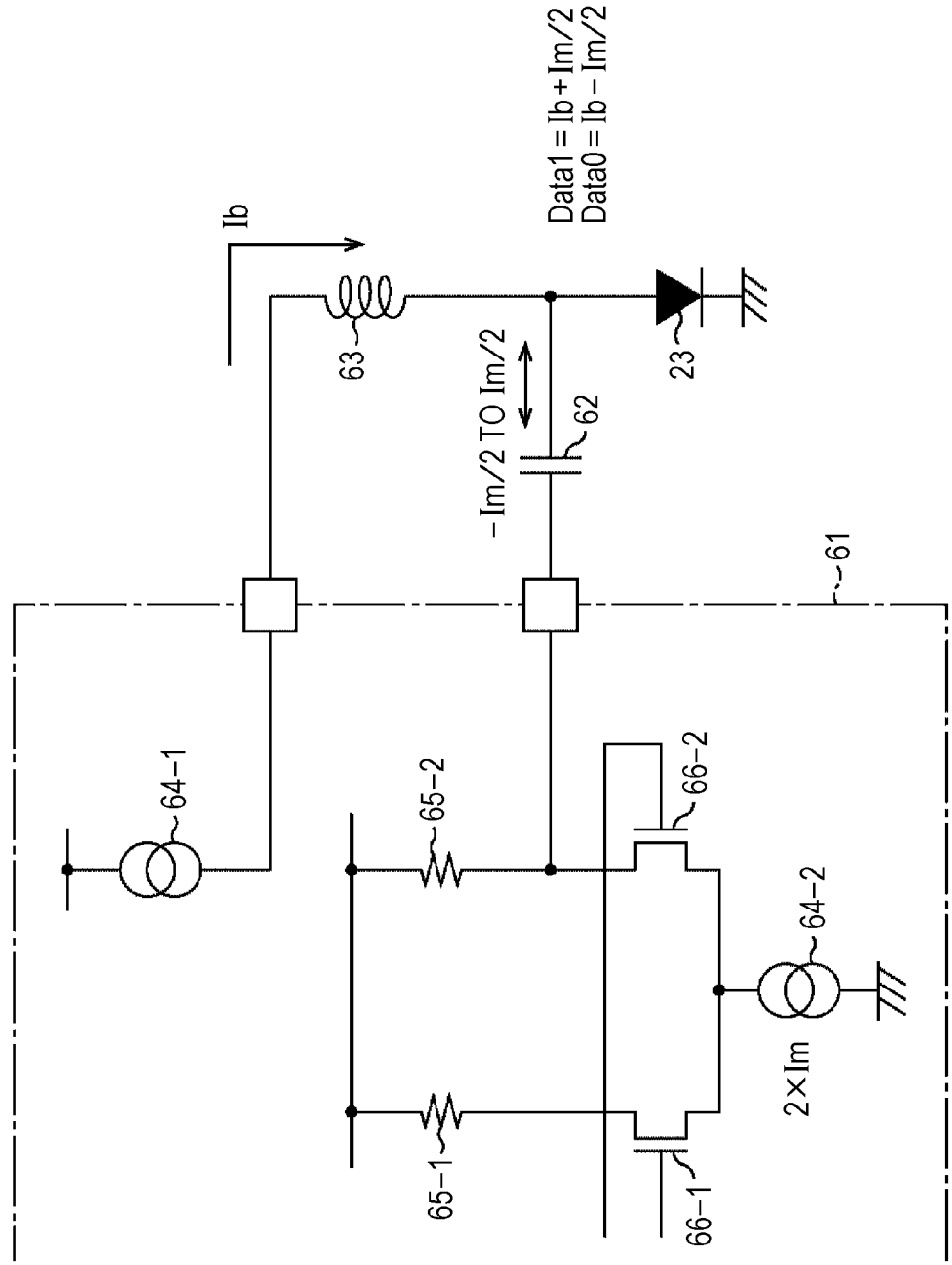
FIG. 5 is an example configuration of a CML-type driving circuit.

Also, in FIG. 5, a current mode logic (CML)-type driving circuit which is used, as the LDD to supply a laser driving current, in the past is illustrated.

As illustrated in FIG. 5, a CML-type driving circuit 61 is connected to the light source for optical communication 23 through a capacitor 62 and a coil 63. The CML-type driving circuit 61 includes current sources 64-1 and 64-2, resistances 65-1 and 65-2, and transistors 66-1 and 66-2.

As illustrated in FIG. 5, the CML-type driving circuit 61 supplies the bias current Ib to the light source for optical communication 23 from the current source 64-1 through a bias tee including the capacitor 62 and the coil 63. Also, the modulation current Im is supplied to the light source for optical communication 23 from the CML-type driving circuit 61 through the capacitor 62. Here, to supply the modulation current Im to the light source for optical communication 23, in the CML-type driving circuit 61, it is necessary to apply double of the modulation current (2×Im) constantly to GND from the power supply through the current source 64-2 regardless of the data Data1 or Data0. Thus, the average current consumption during the driving of the CML-type driving circuit 61 becomes the sum of the bias current Ib and the double of the modulation current Im (=Ib+2×Im).

Also, in the laser driving circuit disclosed in the described PTL 1, average current consumption during the driving is the sum of the bias current Ib and the modulation current Im (=Ib+Im).

In such a manner, in the past, in the CML-type driving circuit 61 in FIG. 5 or in the laser driving circuit in PTL 1, a current larger than ideal average current consumption Ib of the LDD is consumed and it is desired to control current consumption.

Figure 6:
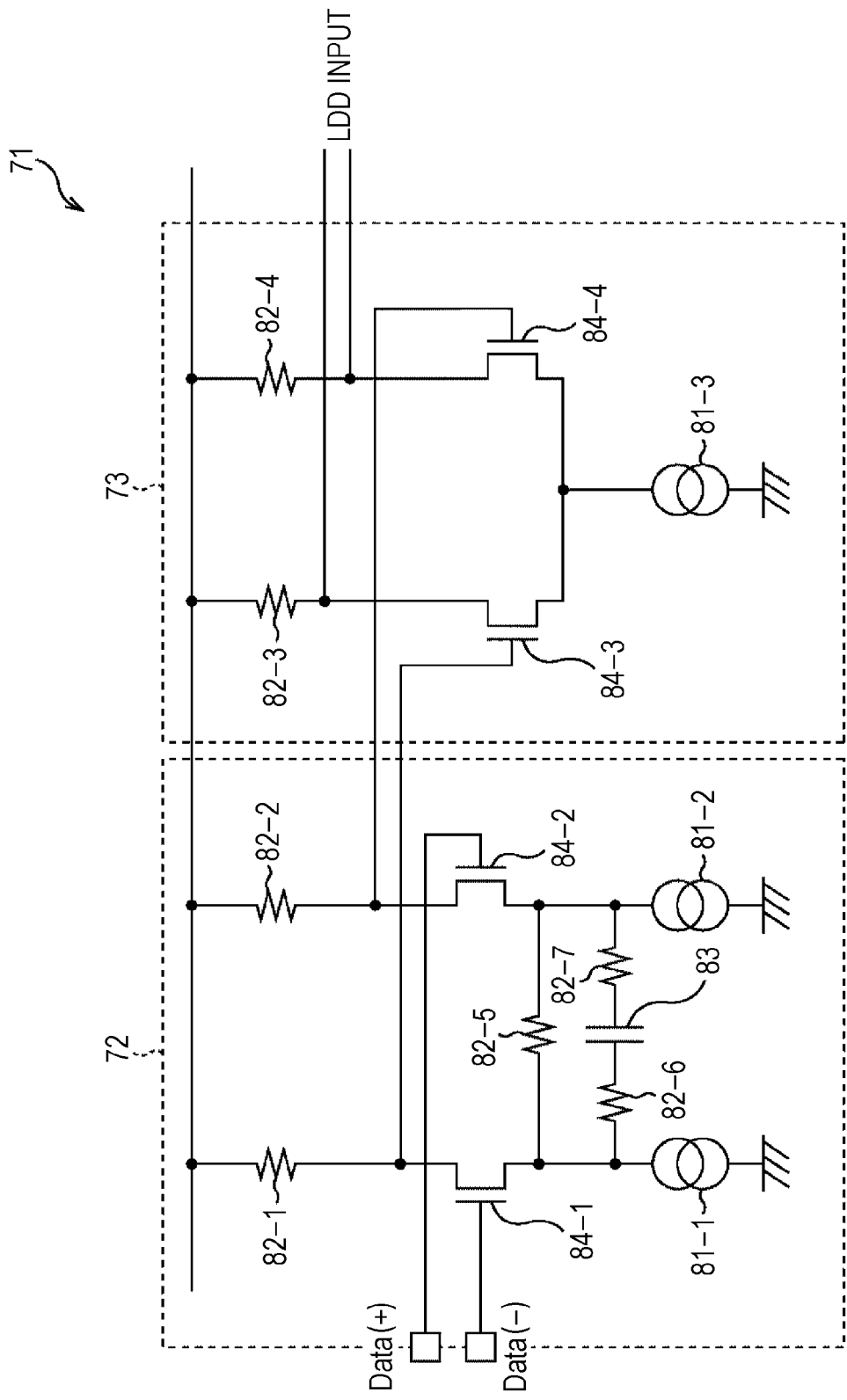
FIG. 6 is a view illustrating an example configuration of an input buffer in related art.

Also, in FIG. 6, an example configuration of an input buffer in related art is illustrated.

As illustrated in FIG. 6, an input buffer 71 includes a waveform shaping circuit 72, an amplifier circuit 73, current sources 81-1 to 81-3, resistances 82-1 to 82-7, a capacitor 83, and transistors 84-1 to 84-4.

In the past, as a standard, a CML-type driving circuit 61 is often a differential input circuit and an electric interface is often a differential transmission. Thus, similarly to the CML-type driving circuit 61 illustrated in FIG. 5, a CML-type has been often used as the input buffer 71. Thus, in a case of a differential input/output circuit and a case of an operation at high speed required for an optical system, the input buffer 71 has been configured as the CML-type which includes a circuit with an adequately wide band. However, the CML-type input buffer 71 consumes large electric power to realize operation in a wide band at high speed, and thus, it is desired to control the current consumption.

Figure 7:
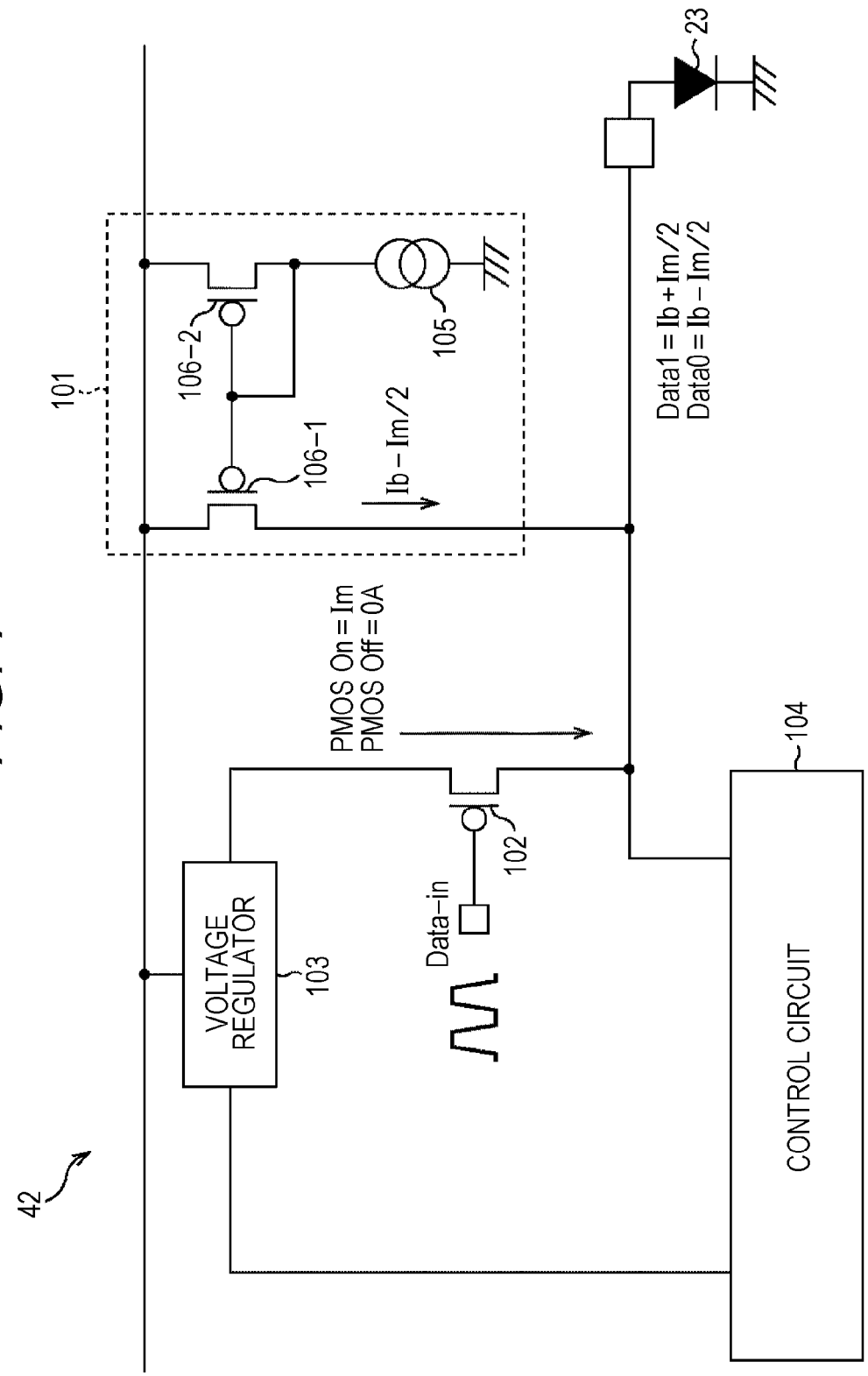
FIG. 7 is a block diagram illustrating an example configuration of a first embodiment of an LDD to which the present technique is applied.

FIG. 7 is a block diagram illustrating an example configuration of a first embodiment of the LDD 42 to which the present technique is applied.

As illustrated in FIG. 7, the LDD 42 includes a constant current supply circuit 101, a PMOS driver 102, a voltage regulator 103, and a control circuit 104.

The constant current supply circuit 101 includes a current source 105 and transistors 106-1 and 106-2. The constant current supply circuit 101 supplies a constant current (Ib−Im/2) to the light source for optical communication 23.

To a gate electrode of the PMOS driver 102, a signal output from the input buffer circuit 41 in FIG. 2 is supplied. The PMOS driver 102 performs driving to switch on/off according to a high level/low level of the signal. The voltage regulator 103 controls a source voltage of the PMOS driver 102 in such a manner that an intended modulation current can be supplied according to an anode voltage of the light source for optical communication 23 of when the data Data1 is supplied to the PMOS driver 102 from the input buffer circuit 41.

The control circuit 104 controls an output from the voltage regulator 103.

Figure 8:
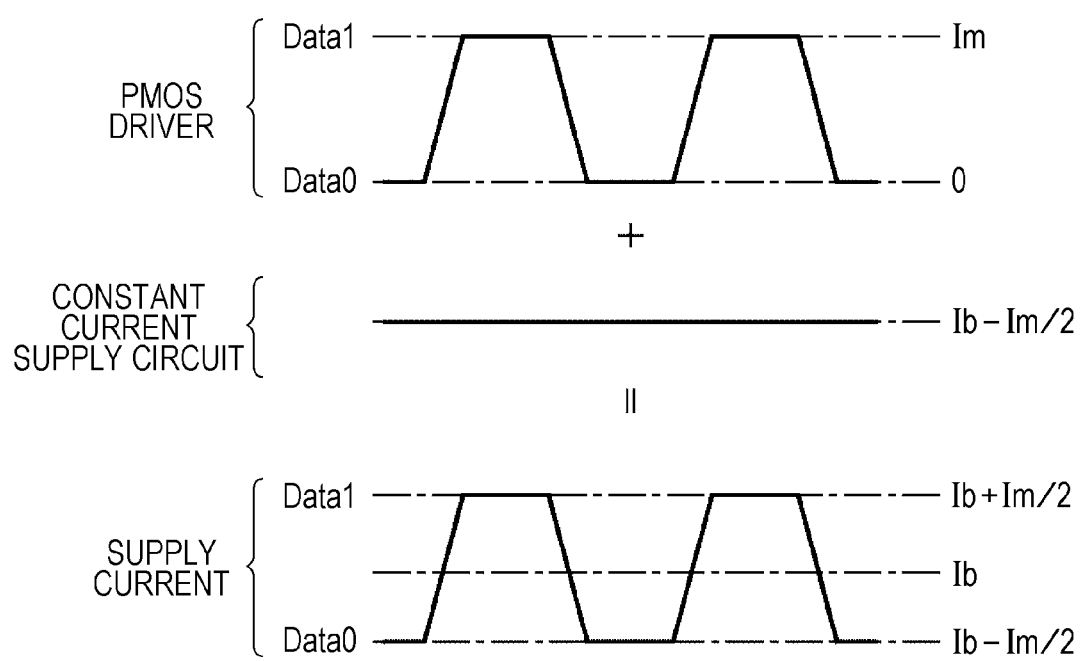
FIG. 8 is a view for describing data and a supply current.

For example, as illustrated in FIG. 8, when an output from the input buffer circuit 41 is the data Data1, the PMOS driver 102 is turned on and a current Im is supplied to the light source for optical communication 23 through the PMOS driver 102. On the other hand, when an output from the input buffer circuit 41 is the data Data0, the PMOS driver 102 is turned off and a current supplied to the light source for optical communication 23 through the PMOS driver 102 becomes zero.

Also, to the light source for optical communication 23, the constant current (Ib−Im/2) is supplied from the constant current supply circuit 101. Thus, when the output from the input buffer circuit 41 is the data Data1, a supply current supplied to the light source for optical communication 23 becomes a current (Ib+Im/2). When the output from the input buffer circuit 41 is the data Data0, the supply current becomes a current (Ib−Im/2).

In such a manner, the LDD 42 can prevent a large current such as what has been described from being generated and can consume only a current of the average current consumption Ib.

Also, in the LDD 42 in FIG. 7, the control circuit 104 controls a source voltage of the PMOS driver 102 in such a manner that the PMOS driver 102 can supply the current Im to the voltage V1 (see FIG. 4) generated when the LDD 42 supplies the current (Ib+Im/2) (current corresponding to current I1 in FIG. 4) to the light source for optical communication 23.

A method for controlling the voltage in the LDD 42 will be described with reference to FIG. 9 and FIG. 10.

Figure 9:
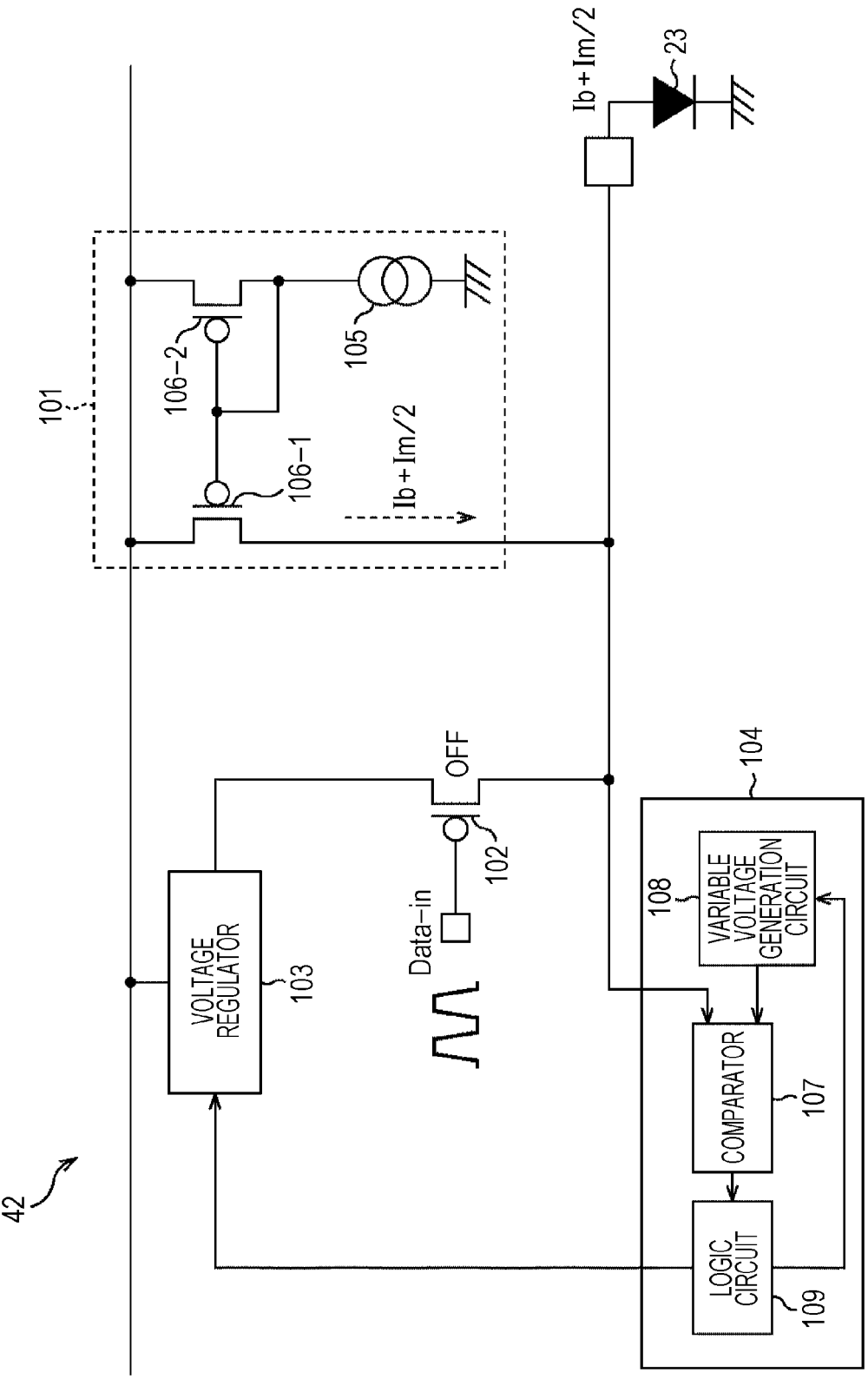
FIG. 9 is a view for describing a method for controlling voltage in the LDD.

In FIG. 9, a method for holding the anode voltage, which is generated when the constant current (Ib+Im/2) is supplied to the light source for optical communication 23, in an internal circuit will be described. With the PMOS driver 102 being turned off, the constant current (Ib+Im/2) is supplied to the light source for optical communication 23 from the constant current supply circuit 101. Thus, an anode voltage V_anode of when the constant current (Ib+Im/2) is supplied to the light source for optical communication 23 is generated in a connection end connected to an anode of the light source for optical communication 23. The control circuit 104 holds the anode voltage of this time.

Figure 10:
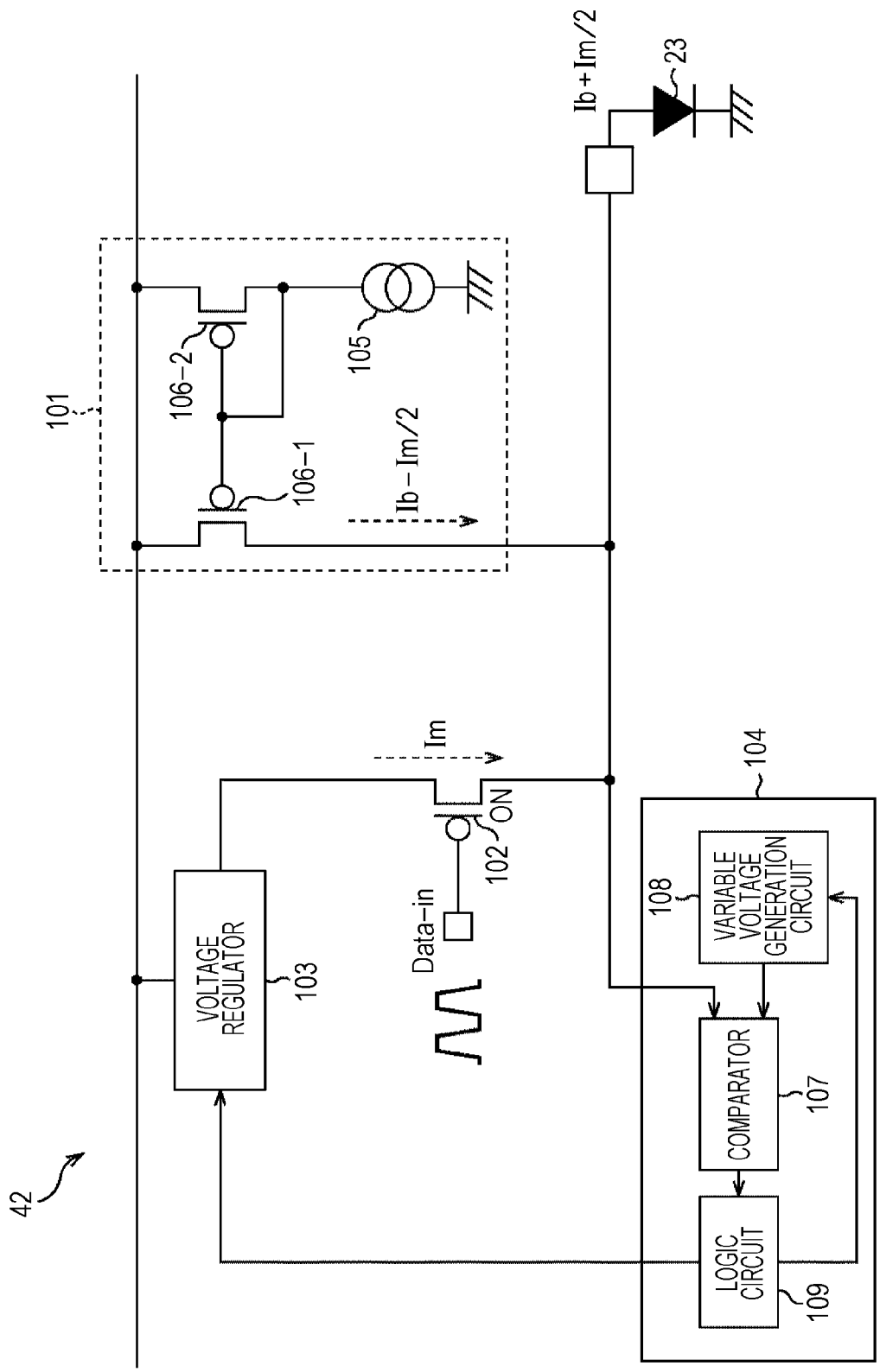
FIG. 10 is a view for describing the method for controlling voltage in the LDD.

In FIG. 10, a method for controlling a source voltage of the PMOS driver 102 will be described. As described with reference to FIG. 9, with the anode voltage V_anode of when the constant current (Ib+Im/2) is supplied to the light source for optical communication 23 being held in the control circuit 104, the PMOS driver 102 is turned on and the constant current (Ib−Im/2) is supplied to the light source for optical communication 23 from the constant current supply circuit 101.

Here, a current supplied from the PMOS driver 102 (hereinafter referred to as current A) and the constant current (Ib−Im/2) are supplied to the light source for optical communication 23. To the light source for optical communication 23, a current (Ib−Im/2+A) is supplied.

Here, by controlling the source voltage of the PMOS driver 102 by the voltage regulator 103, the current A supplied from the PMOS driver 102 can be adjusted. The control circuit 104 compares the anode voltage V_anode held therein and the voltage generated in the connection end connected to the anode of the light source for optical communication 23 and controls the source voltage of the PMOS driver 102 in such a manner that the anode voltage V_anode matches the voltage generated in the connection end connected to the anode of the light source for optical communication 23. Thus, the current A supplied from the PMOS driver 102 becomes the current Im and the source voltage of the PMOS driver 102, with which source voltage the intended current Im can be supplied from the PMOS driver 102, can be determined.

Here, the method for controlling the voltage in the LDD 42 will be described in further detail. As illustrated in FIG. 9 and FIG. 10, the control circuit 104 includes a comparator 107, a variable voltage generation circuit 108, and a logic circuit 109.

First, as illustrated in FIG. 9, the voltage V0 (see FIG. 4), which is generated when the constant current (Ib−Im/2) is supplied to the light source for optical communication 23 with the PMOS driver 102 being turned off, is input into the comparator 107 of the control circuit 104. Also, a variable reference voltage Vref is input into the comparator 107 from the variable voltage generation circuit 108. The comparator 107 compares the voltage V0 and the reference voltage Vref. Then, the logic circuit 109 processes an output (comparison result) from the comparator 107 and controls the variable voltage generation circuit 108 in such a manner that the voltage V0 and the reference voltage Vref become equal to each other (V0=Vref). The logic circuit 109 holds the reference voltage Vref (=V0) of this time.

Next, the voltage V1 (see FIG. 4), which is generated when the constant current (Ib+Im/2) is supplied to the light source for optical communication 23 with the PMOS driver 102 being turned off, is input into the comparator 107 of the control circuit 104. Also, a variable reference voltage Vref is input into the comparator 107 from the variable voltage generation circuit 108. The comparator 107 compares the voltage V1 and the reference voltage Vref. Then, the logic circuit 109 processes an output (comparison result) from the comparator 107 and controls the variable voltage generation circuit 108 in such a manner that the voltage V1 and the reference voltage Vref become equal to each other (V1=Vref). The logic circuit 109 holds the reference voltage Vref (=V1) of this time.

Then, as illustrated in FIG. 10, to turn on the PMOS driver 102 and to apply current amplitude Im (see FIG. 4) corresponding to a difference between the voltage V0 and the voltage V1 held by the logic circuit 109, it is necessary to control the source voltage of the PMOS driver 102. That is, by supplying, to the voltage regulator 103, a voltage signal to apply the current amplitude Im, the logic circuit 109 controls a current of a variable current source 111 included in the voltage regulator 103 illustrated in FIG. 11 which will be described later. Accordingly, the source voltage of the PMOS driver 102 is adjusted by the voltage regulator 103 and a current of the current amplitude Im is supplied to the light source for optical communication 23 through the PMOS driver 102.

In this way, the control circuit 104 can perform adjustment in such a manner that an optimal modulation current, which matches a characteristic of the light source for optical communication 23, is supplied to the light source for optical communication 23 from the voltage regulator 103 through the PMOS driver 102.

Figure 11:
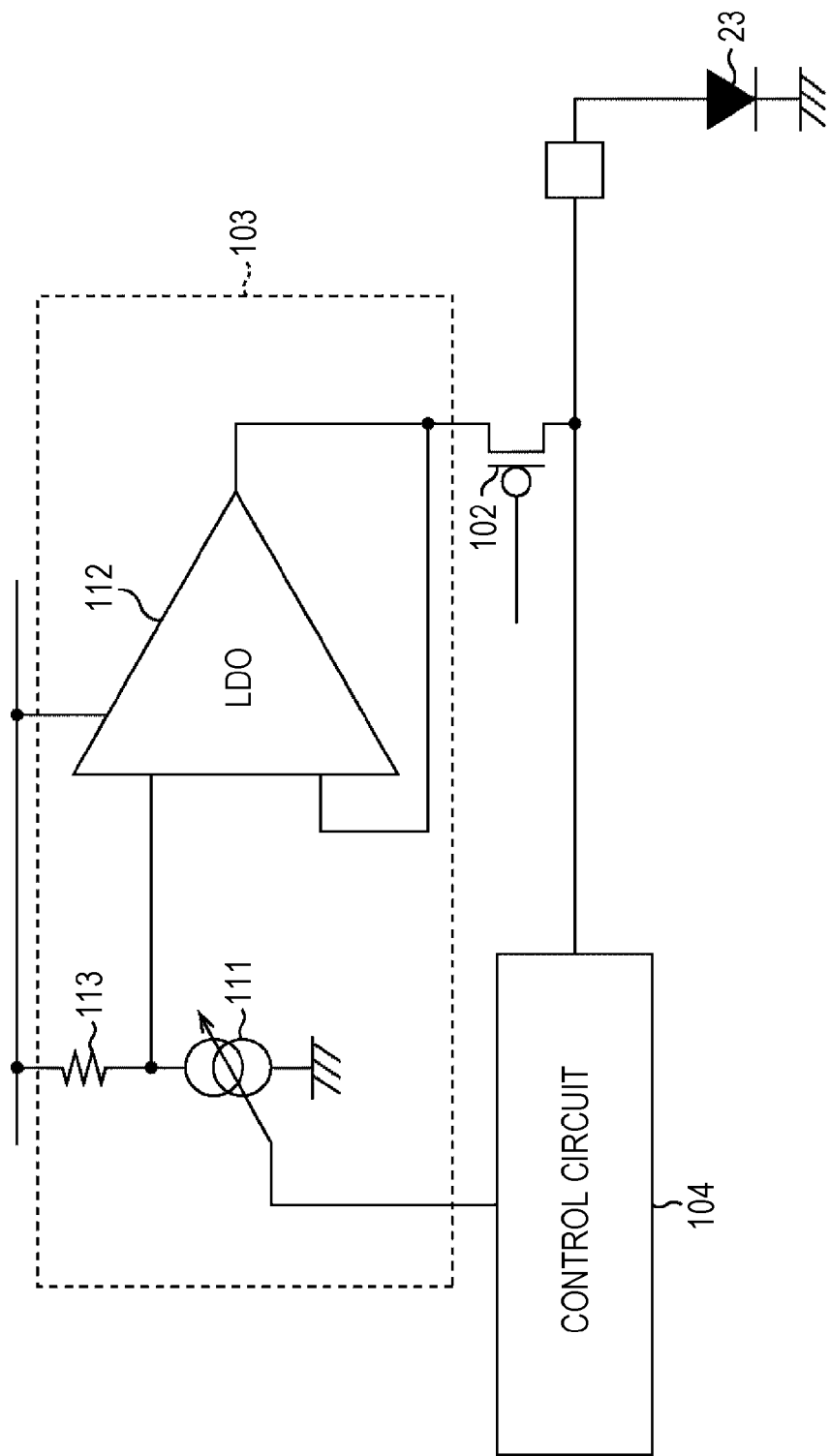
FIG. 11 is a view illustrating an example configuration of a voltage regulator.

Next, FIG. 11 is a view illustrating an example configuration of the voltage regulator 103 which controls the source voltage of the PMOS driver 102.

As illustrated in FIG. 11, the voltage regulator 103 includes the variable current source 111, a low drop out constant regulator (LDO) 112, and a resistance 113.

By digitally controlling a reference voltage of the low drop out constant regulator 112 with the resistance 113 and the variable current source 111, the voltage regulator 103 can adjust the source voltage of the PMOS driver 102. Thus, by controlling the source voltage of the PMOS driver 102, the voltage regulator 103 makes it possible for the PMOS driver 102 to supply an intended current Im to the light source for optical communication 23.

Figure 12:
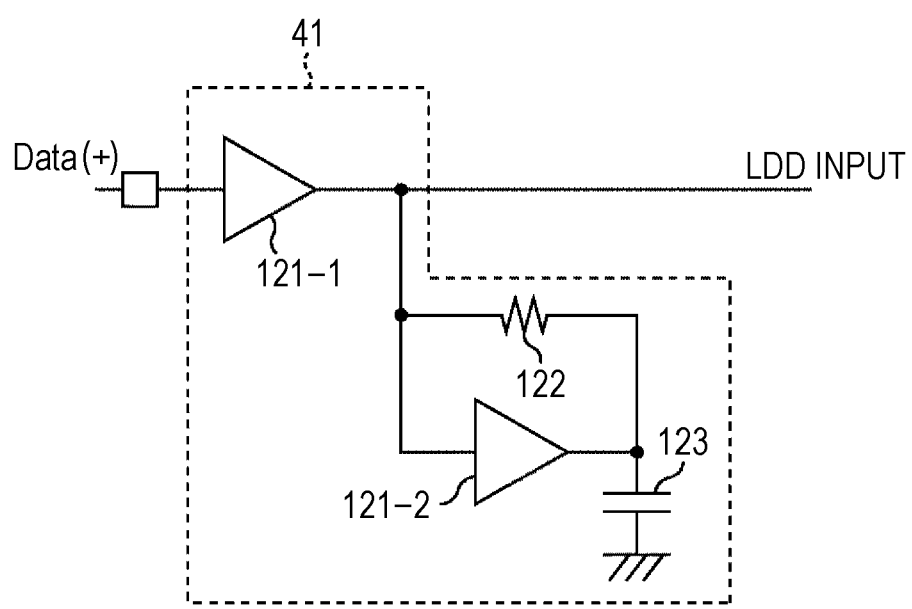
FIG. 12 is a view illustrating an example configuration of an input buffer circuit.

Next, FIG. 12 is a view illustrating an example configuration of the input buffer circuit 41.

As illustrated in FIG. 12, the input buffer circuit 41 includes inverters 121-1 and 121-2, a feedback resistance 122, and a capacitor 123. The input buffer circuit 41 drives the PMOS driver 102 of the LDD 42.

Figure 13A:
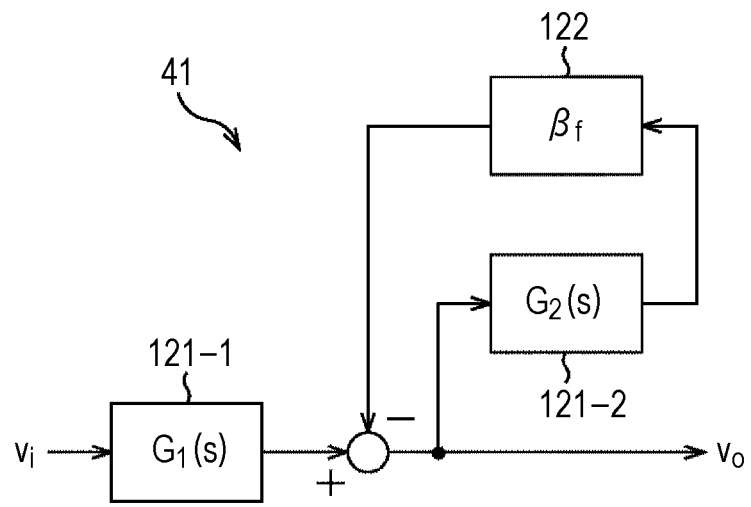
FIG. 13A and FIG. 13B are a block diagram and a chart illustrating the input buffer circuit.
Figure 13B:
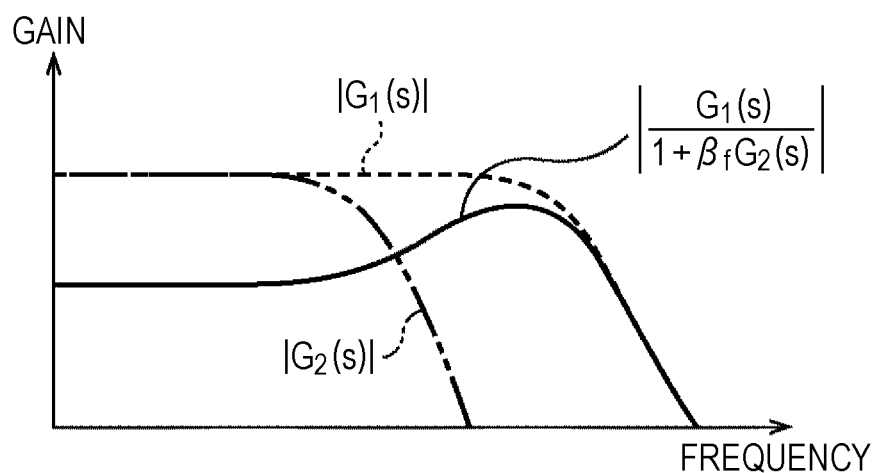

As described, the LDD 42 is a single-end input circuit. As an output of the input buffer circuit 41 connected to the LDD 42, a single-end output circuit is used. Thus, in the input buffer circuit 41, a single-end input/output-type amplifier circuit (amplifier) to amplify a signal with the inverter 121-1 is configured. By returning a signal which is an output signal, to which a negative feedback is applied, of the inverter 121-2 to the output signal of the inverter 121-1, a single-end equalizer is realized. The feedback resistance 122 and the capacitor 123 are connected to the inverter 121-2. In FIG. 13A and FIG. 13B, a block diagram and a chart of the input buffer circuit 41 are illustrated.

As illustrated in FIG. 13A, the inverter 121-1 is expressed by a transfer function G1 (s). The inverter 121-2 to which the feedback resistance 122 and the capacitor 123 are connected is expressed by a transfer function G2 (s). The feedback resistance 122 is expressed by a feedback factor βf. Also, the transfer function G (s) of the input buffer circuit 41 is calculated in such a manner illustrated in FIG. 13A based on an input voltage Vi input into the input buffer circuit 41 and an output voltage Vo output from the input buffer circuit 41.

In FIG. 13B, an outline of a gain characteristic by the input buffer circuit 41 is illustrated.

As illustrated in FIG. 13B, a gain of the transfer function G (s) becomes constant when both of the transfer function G1 (s) and the transfer function G2 (s) are in a passband. Also, the gain of the transfer function G (s) decreases when the transfer function G1 (s) is in the passband and the transfer function G2 (s) increases and when both of the transfer function G1 (s) and the transfer function G2 (s) are in a cutoff band. Thus, the gain of the transfer function G (s) has a peak.

By combining such a peak characteristic of the gain of the transfer function G (s) and an attenuation characteristic of the input signal, waveform-shaping is performed. Thus, in the input buffer circuit 41, an equalizer is realized.

Figure 14A:
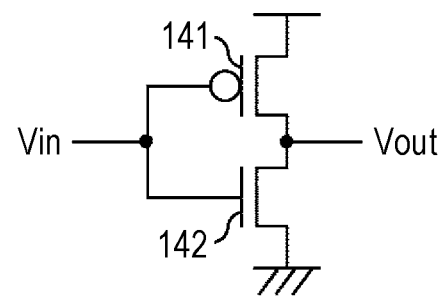
FIG. 14A and FIG. 14B are views illustrating a CMOS inverter.

Also, as the inverter 121 used in the input buffer circuit 41, a complementary metal oxide semiconductor (CMOS) inverter can be employed. For example, in FIG. 14A, a CMOS inverter including a positive channel metal oxide semiconductor (PMOS)-type transistor 141 and a negative channel metal oxide semiconductor (NMOS)-type transistor 142 being combined with each other is illustrated.

Figure 14B:
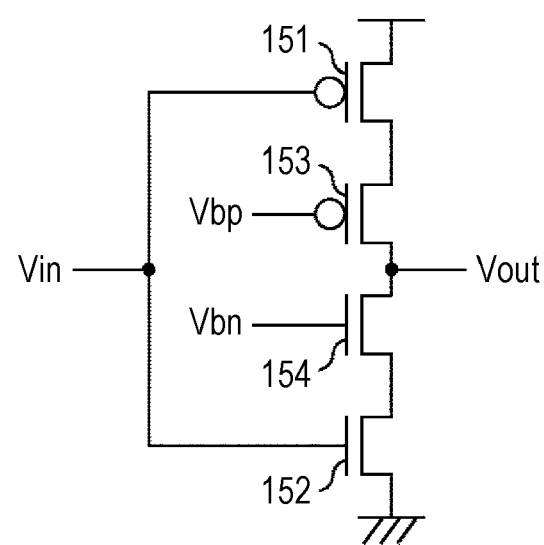
Figure 15:
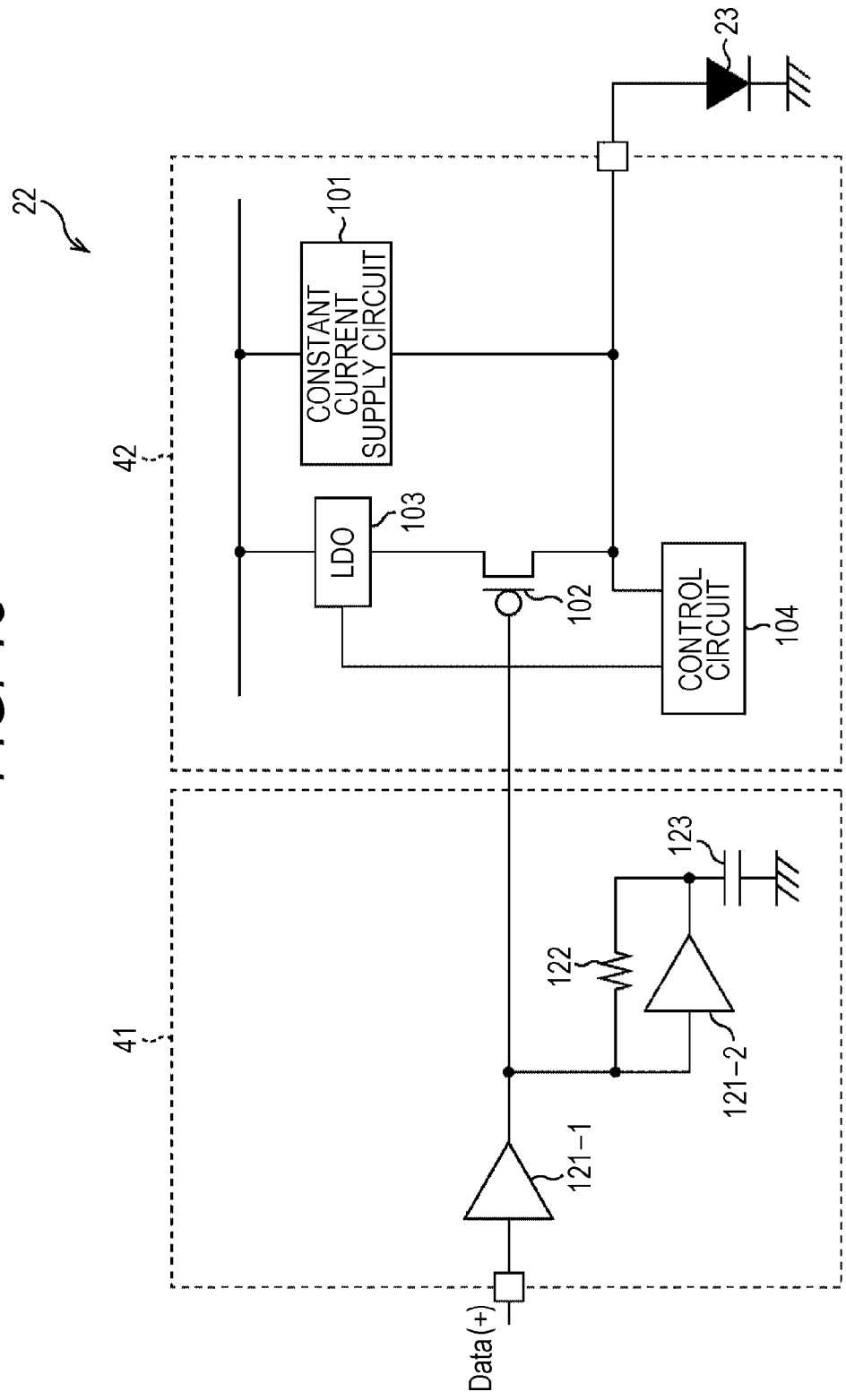
FIG. 15 is a view illustrating an example configuration of the optical transmission circuit.

Also, as the inverter 121 used in the input buffer circuit 41, a cascode-type CMOS inverter can be employed. For example, in FIG. 14B, a cascode-type CMOS inverter is illustrated. In the cascode-type CMOS inverter, a gate voltage of a PMOS-type transistor 153 connected to a drain side of a PMOS-type transistor 151 is biased to arbitrary potential Vbp and a gate voltage of an NMOS-type transistor 154 connected to a drain side of an NMOS-type transistor 152 is biased to arbitrary potential Vbn. Next, in FIG. 15, an example configuration of the optical transmission circuit 22 to which the LDD 42 in FIG. 7 and the input buffer circuit 41 in FIG. 12 are mounted is illustrated.

A positive signal Data (+) is input into the input buffer circuit 41 from the signal processing circuit 21 in FIG. 1. The input buffer circuit 41 performs waveform-shaping and amplification of a single-end signal. Here, the gate voltage of the PMOS driver 102 of the LDD 42 is driven by a signal output from the input buffer circuit 41, and thus, the PMOS driver 102 is turned on/off. Thus, an intended modulation current is generated in the voltage regulator 103 controlled through the control circuit 104 and is superimposed on the bias current supplied from the constant current supply circuit 101, whereby the light source for optical communication 23 is driven. Thus, the optical transmission circuit 22 can output an optical signal with low electric power consumption.

Figure 16:
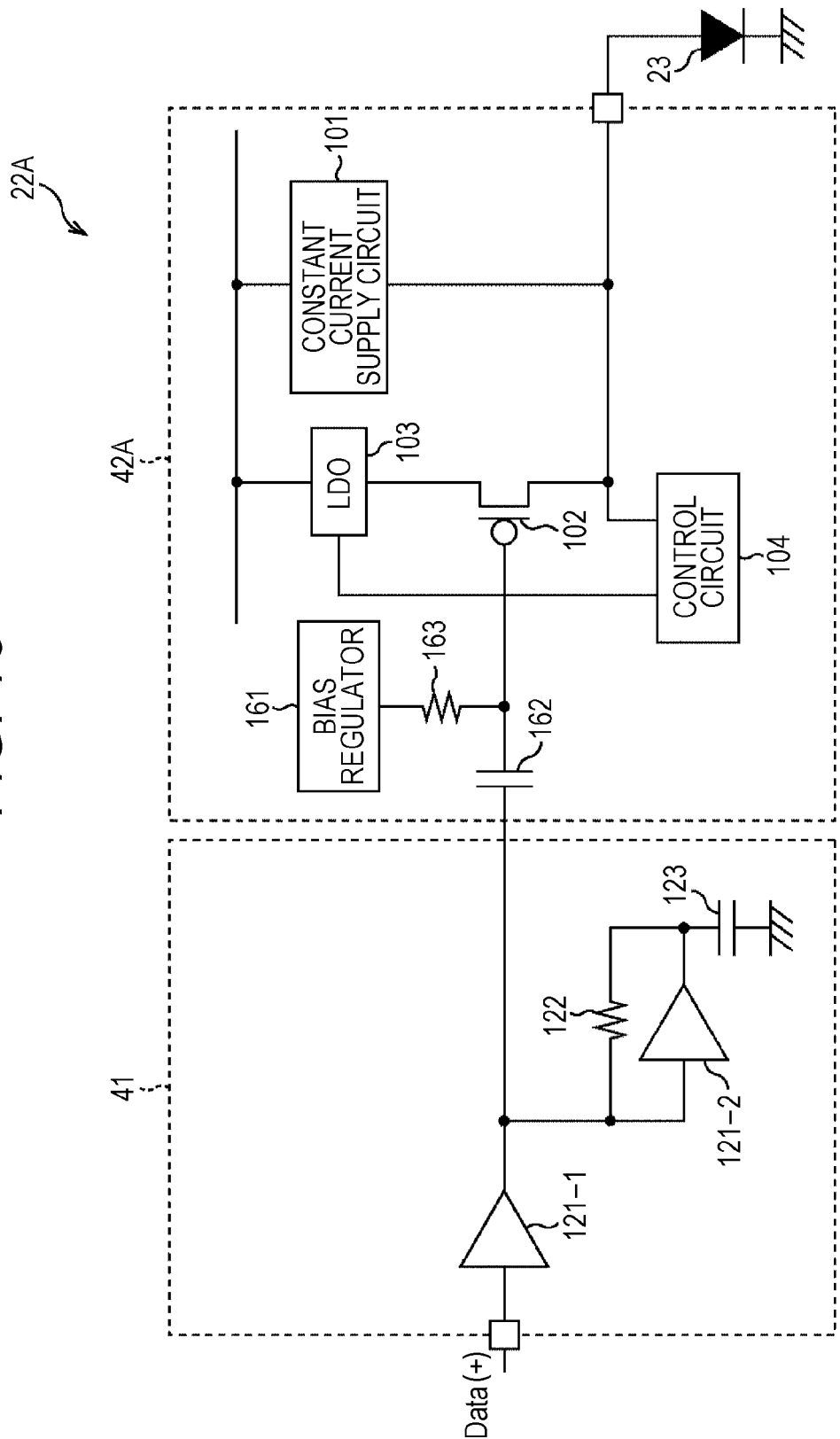
FIG. 16 is a view illustrating a first modification of the optical transmission circuit.

In FIG. 16, a first modification of the optical transmission circuit 22 is illustrated.

As illustrated in FIG. 16, an optical transmission circuit 22A includes an input buffer circuit 41 and an LDD 42A. The input buffer circuit 41 is configured in a manner similar to the input buffer circuit 41 in FIG. 12. The LDD 42A is configured in a manner similar to the LDD 42 in FIG. 7 in a point that the LDD 42A includes a constant current supply circuit 101, a PMOS driver 102, a voltage regulator 103, and a control circuit 104. On the other hand, the LDD 42A further includes a bias regulator 161, a capacitor 162, and a resistance 163.

That is, in the LDD 42A, an output terminal of the input buffer circuit 41 and a gate electrode of the PMOS driver 102 are connected to each other through the capacitor 162 and the bias regulator 161 is connected, through the resistance 163, to wiring which connects the capacitor 162 and the gate electrode of the PMOS driver 102. According to a high level and low level signals of an output voltage of the input buffer circuit 41, the bias regulator 161 performs control in such a manner that a gate voltage Vg applied to the gate electrode of the PMOS driver 102 becomes an intended bias value. That is, in a case of turning on the PMOS driver 102, the bias regulator 161 performs control in such a manner that the gate voltage Vg applied to the gate electrode of the PMOS driver 102 becomes a voltage to turn on the PMOS driver 102. On the other hand, in a case of turning off the PMOS driver 102, the bias regulator 161 performs control in such a manner that the gate voltage Vg applied to the gate electrode of the PMOS driver 102 becomes a voltage to turn off the PMOS driver 102.

Thus, in the LDD 42A, a voltage adequate to drive the PMOS driver 102 can be supplied from the bias regulator 161 and the PMOS driver 102 can be driven securely.

Figure 17:
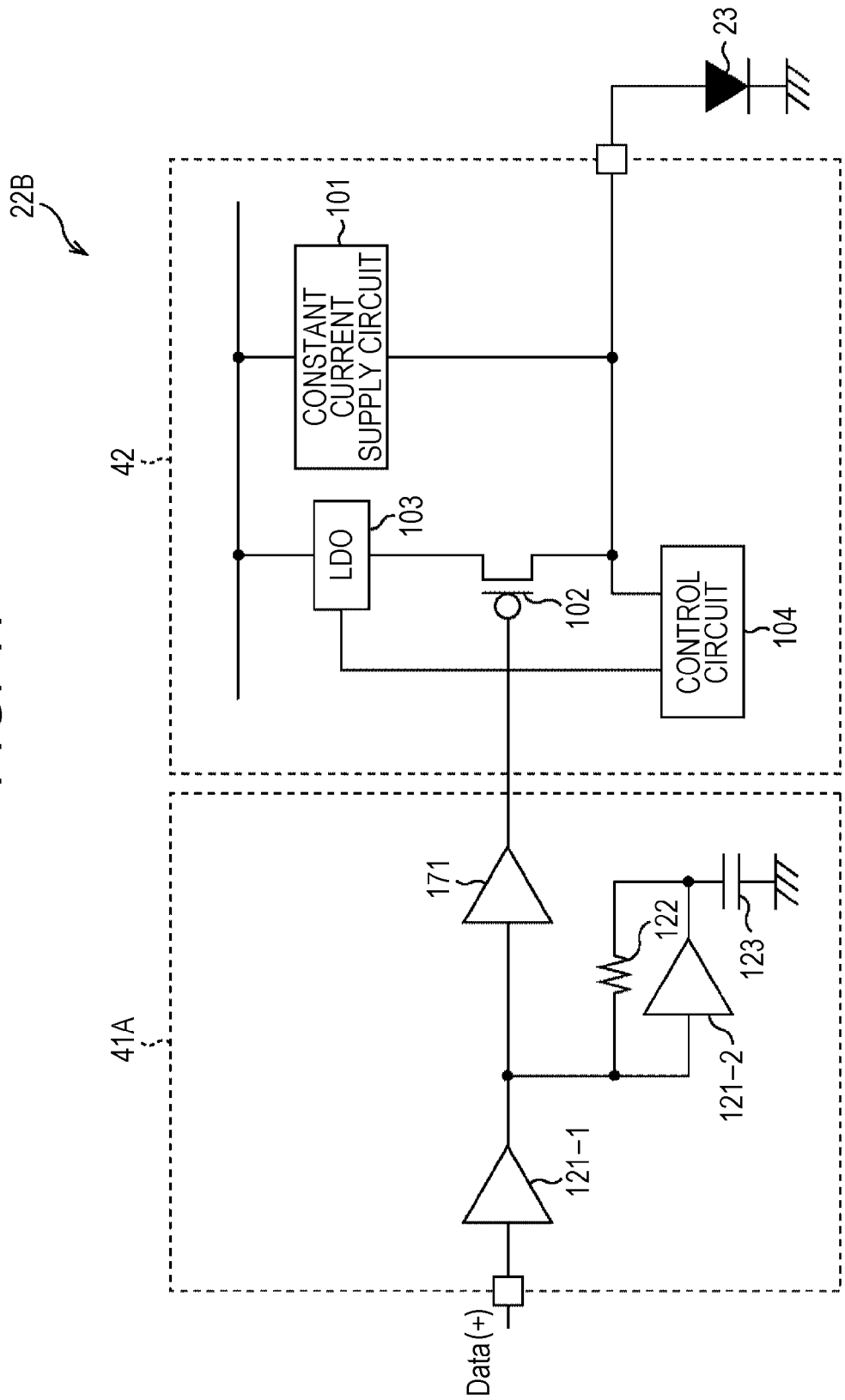
FIG. 17 is a view illustrating a second modification of the optical transmission circuit.

In FIG. 17, a second modification of the optical transmission circuit 22 is illustrated.

As illustrated in FIG. 17, an optical transmission circuit 22B includes an input buffer circuit 41A and an LDD 42. The LDD 42 is configured in a manner similar to the LDD 42 in FIG. 12.

The input buffer circuit 41A is configured in a manner similar to the input buffer circuit 41 in FIG. 12 in a point that the input buffer circuit 41A includes inverters 121-1 and 121-2, a feedback resistance 122, and a capacitor 123. On the other hand, the input buffer circuit 41A further includes an amplifier 171.

That is, in the input buffer circuit 41A, an output terminal of the inverter 121-1 is connected to an input terminal of the amplifier 171 and an output terminal of the amplifier 171 is connected to a gate electrode of a PMOS driver 102.

For example, in the above described optical transmission circuit 22, depending on output amplitude of the signal processing circuit 21, amplitude adequate to drive the PMOS driver 102 may not be obtained only by the input buffer circuit 41 with an equalizer function.

On the other hand, in the optical transmission circuit 22B, since the input buffer circuit 41A includes the amplifier 171, the amplifier 171 amplifies a voltage signal supplied to the PMOS driver 102. Thus, a gain of a signal applied to the gate electrode of the PMOS driver 102 can be obtained and the PMOS driver 102 can be driven securely.

Figure 18:
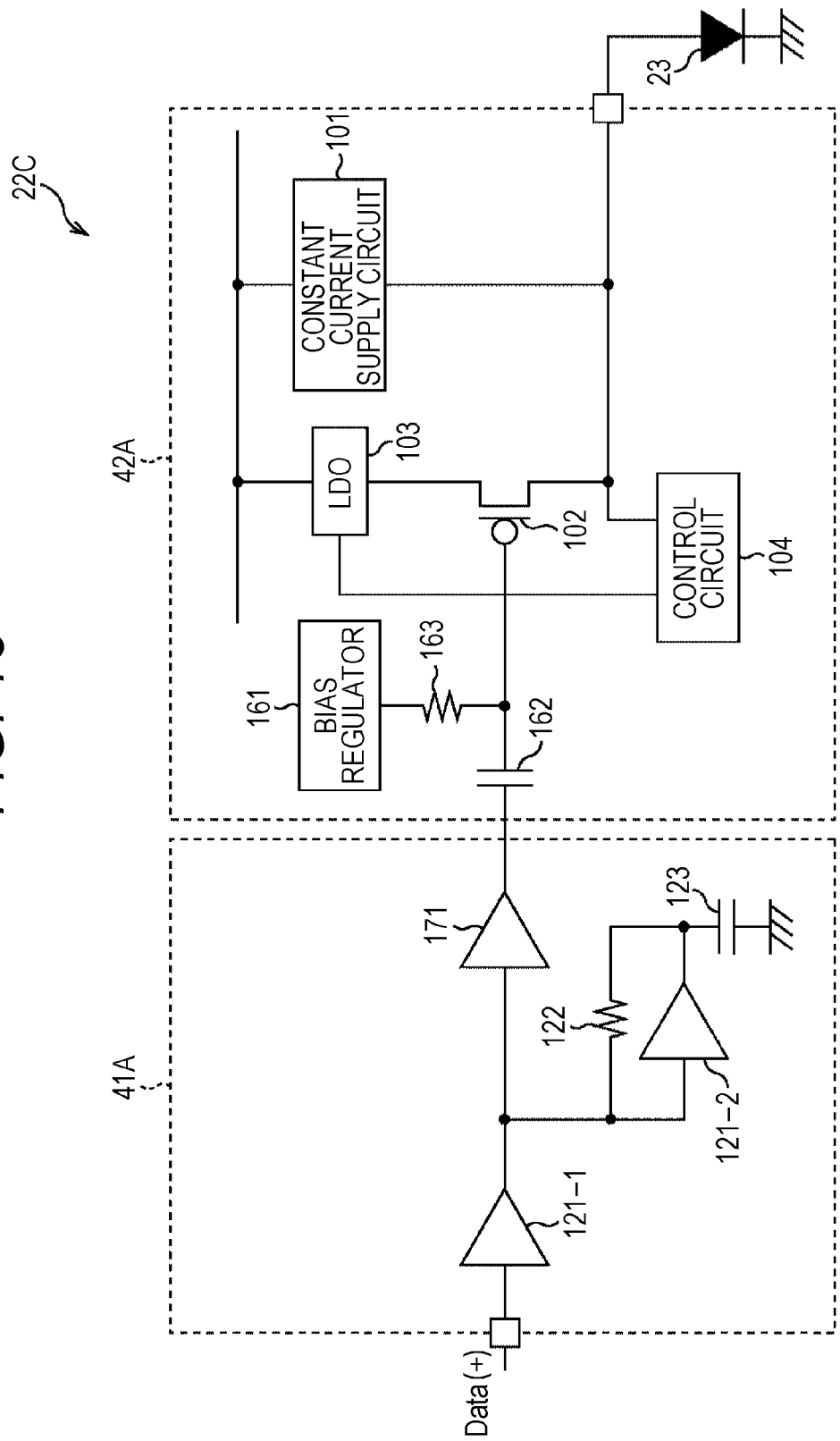
FIG. 18 is a view illustrating a third modification of the optical transmission circuit.

Next, in FIG. 18, a third modification of the optical transmission circuit 22 is illustrated.

As illustrated in FIG. 18, an optical transmission circuit 22C includes an input buffer circuit 41A and an LDD 42A. That is, the optical transmission circuit 22C includes the input buffer circuit 41A illustrated in FIG. 17 and the LDD 42A illustrated in FIG. 16.

In the optical transmission circuit 22C configured in such a manner, as described with reference to FIG. 16 and FIG. 17, a PMOS driver 102 can be driven securely in the LDD 42A.

Incidentally, when the number of parallel optical transmissions is increased in an optical transmission device 12, it is assumed that electric power consumption becomes a problem. Thus, an optical transmission device which can perform a multichannel transmission will be described.

Figure 19:
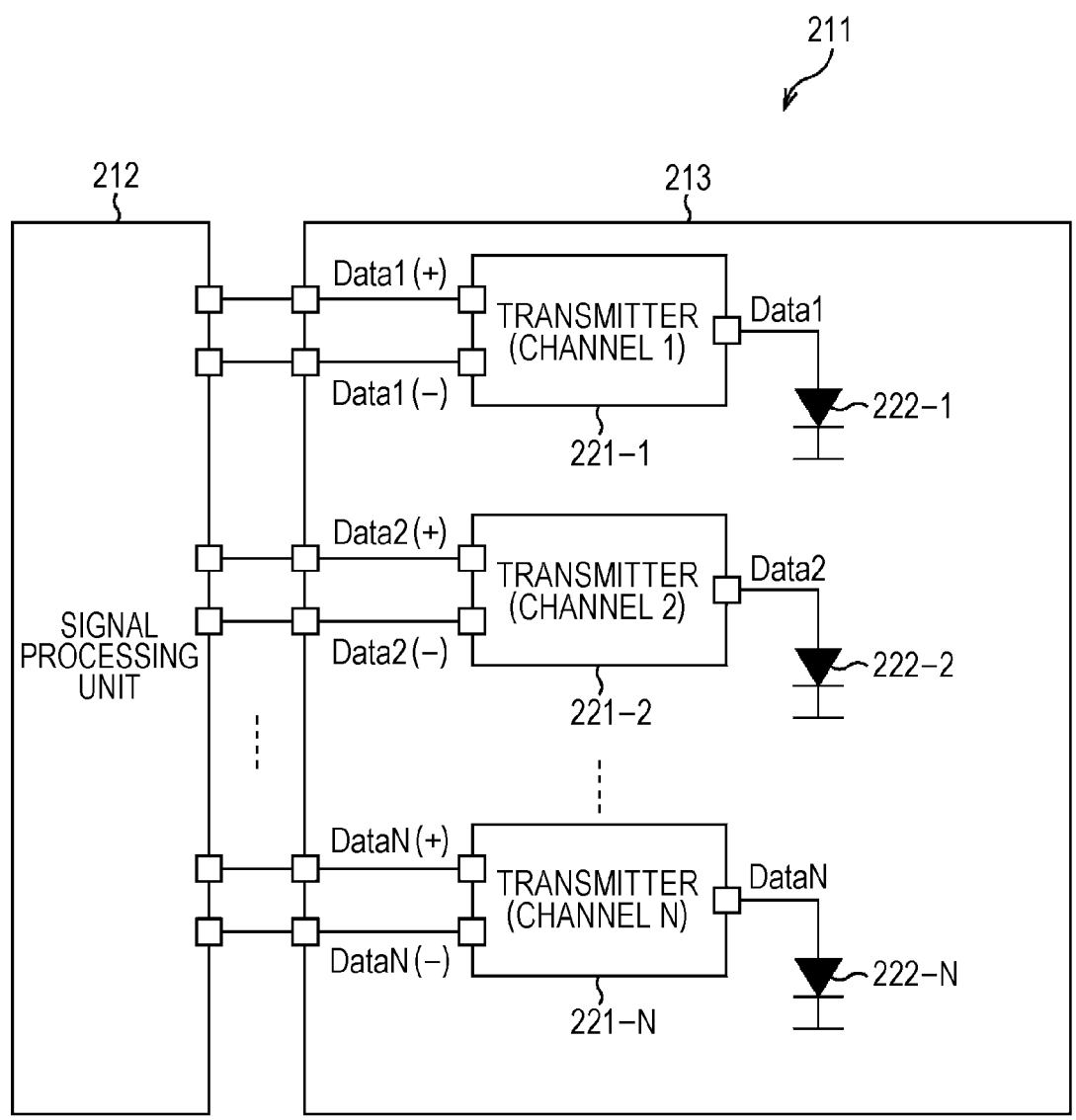
FIG. 19 is a view illustrating an optical transmission device which can perform a multichannel transmission.

An optical transmission device 211 illustrated in FIG. 19 includes a signal processing unit 212 which can output differential voltage signals in N stages in parallel and an optical transmission circuit 213 which can output optical signals in N stages in parallel.

The optical transmission circuit 213 includes transmitters 221-1 to 221-N, the number of transmitters being N. To the transmitters 221-1 to 221-N, light sources for optical communication 222-1 to 222-N are respectively connected. Each of the transmitters 221-1 to 221-N includes an input buffer circuit 41 and an LDD 42. The transmitters 221-1 to 221-N respectively supply current signals to the light sources for optical communication 222-1 to 222-N in a parallel manner according to the differential voltage signals supplied from the signal processing unit 212.

In an optical transmission device 211 configured in such a manner, with low electric power consumption, it is possible to perform optical transmissions in parallel. Note that the optical transmission circuit 213 in FIG. 19 includes the transmitters 221-1 to 221-N and the light sources for optical communication 222-1 to 222-N. However, for example, the optical transmission circuit 213 may only include the transmitters 221-1 to 221-N and the light sources for optical communication 222-1 to 222-N may be connected to the optical transmission circuit 213.

Also, the optical transmission circuit 213 may include the signal processing unit 212 and the transmitters 221-1 to 221-N. Also, the optical transmission circuit 213 may include the signal processing unit 212, the transmitters 221-1 to 221-N, and the light sources for optical communication 222-1 to 222-N.

Figure 20A:
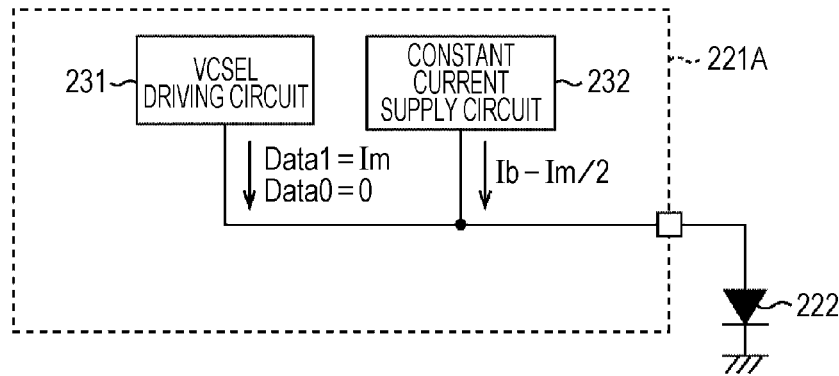
FIG. 20A to FIG. 20C are views illustrating a modification of the optical transmission device.
Figure 20B:
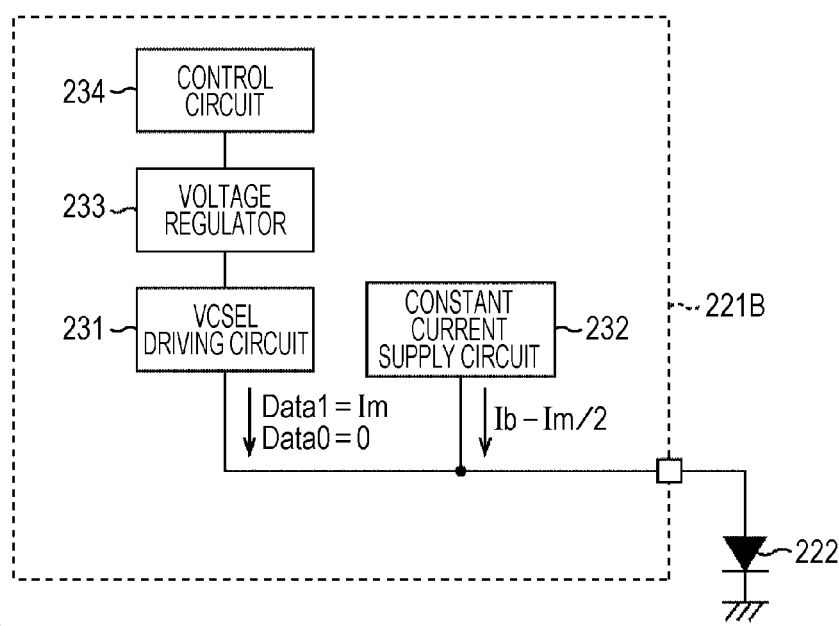
Figure 20C:
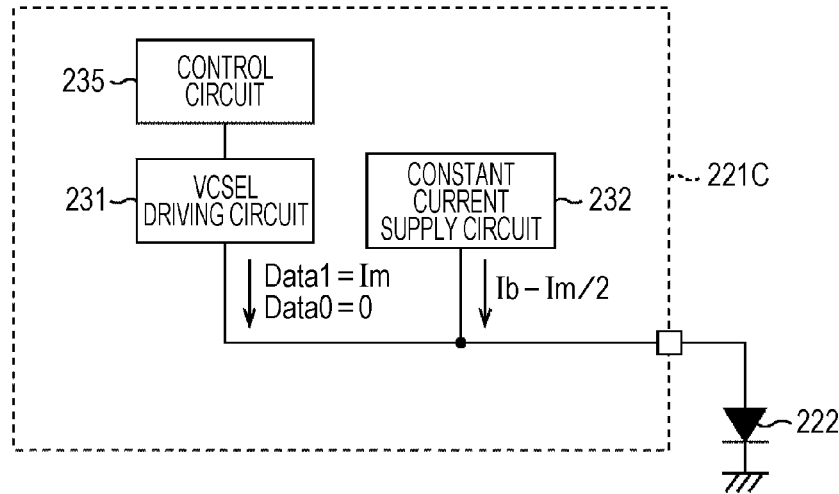

Next, in FIG. 20A to FIG. 20C, a modification of the optical transmission device 12 is illustrated.

An optical transmission device 221A illustrated in FIG. 20A includes a VCSEL driving circuit 231 and a constant current supply circuit 232. The optical transmission device 221A outputs a current signal to drive a VCSEL 222. That is, the VCSEL driving circuit 231 outputs a current Im in a case of data Data1 and makes an output of a current into zero in a case of data Data0. The constant current supply circuit 232 outputs a constant current (Ib−Im/2).

An optical transmission device 221B illustrated in FIG. 20B includes a VCSEL driving circuit 231, a constant current supply circuit 232, a voltage regulator 233, and a control circuit 234. The optical transmission device 221B outputs a current signal to drive the VCSEL 222. In the optical transmission device 221B, a control is performed by the control circuit 234 in such a manner that the voltage regulator 233 can generate an intended voltage. Thus, the VCSEL driving circuit 231 can securely output the current Im in a case of the data Data1 and can securely make an output of the current into zero in a case of the data Data0.

An optical transmission device 221C illustrated in FIG. 20C includes a VCSEL driving circuit 231, a constant current supply circuit 232, and a control circuit 235. The optical transmission device 221C outputs a current signal to drive the VCSEL 222. In the optical transmission device 221C, the control circuit 235 controls the VCSEL driving circuit 231 itself and can obtain an intended voltage. For example, the control circuit 235 performs control to adjust a current by changing a size of an element (such as MOS) in the VCSEL driving circuit 231.

Note that in the above description, the light source for optical communication 23 has been described with the vertical cavity surface emitting laser as an example. However, in the optical transmission device 12, a different laser diode may be employed as the light source for optical communication 23. Also, although it has been described that the LDD 42 includes the PMOS driver 102, either of a PMOS and an NMOS drivers may be used.

Next, with reference to FIG. 21, an example configuration of an optical communication chip including a plurality of optical transmission circuits 22 will be described.

Figure 21:
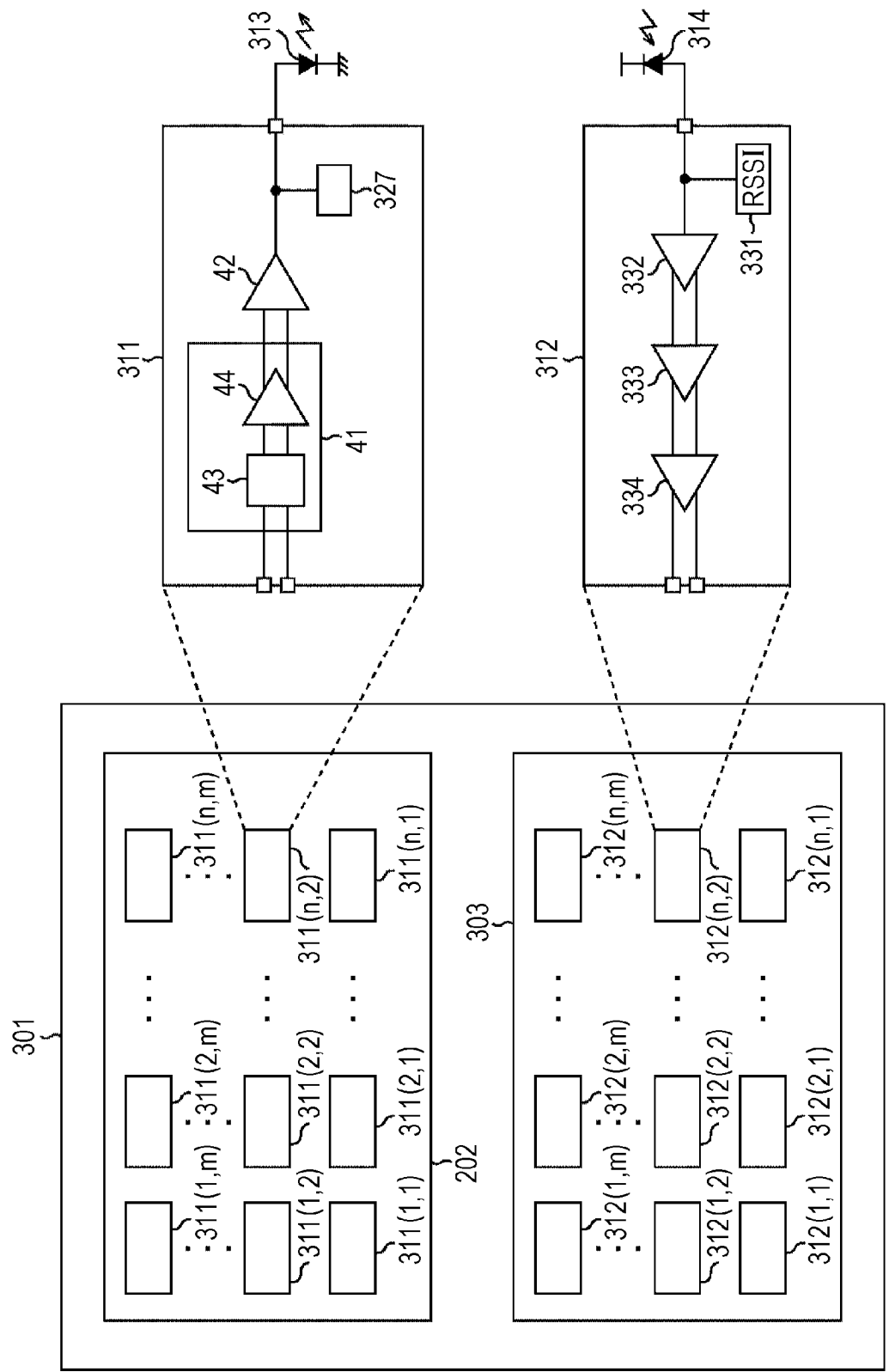
FIG. 21 is a view illustrating an example configuration of an optical communication chip including a plurality of optical transmission circuits.

As illustrated in FIG. 21, an optical communication chip 301 includes an optical transmission block 302 and an optical reception block 303. The optical communication chip 301 is mounted, for example, to an optical communication device including functions of both of the optical transmission device 12 and the optical reception device 14 which are in FIG. 1. That is, the optical communication chip 301 can transmit an optical signal through an optical transmission path 13 in a manner similar to the optical transmission device 12 and can receive an optical signal in a manner similar to the optical reception device 14.

Also, in the optical communication chip 301, the optical transmission block 302 includes a plurality of transmission units 311 and the optical reception block 303 includes a plurality of reception units 312. For example, in the configuration example in FIG. 21, the optical transmission block 302 includes transmission units 311 (1, 1) to 311 (n, m) arranged on a single plane in a matrix of m rows×n columns. Similarly, the optical reception block 303 includes reception units 312 (1, 1) to 312 (n, m) arranged planarly in m rows×n columns. Here, m and n are arbitrary integer numbers. Also, in the optical communication chip 301, light sources for optical communication 313 are respectively connected to the transmission units 311 in the optical transmission block 302 and the light receiving elements 314 are respectively connected to the reception units 312 in the optical reception block 303.

Thus, in the optical communication chip 301, the plurality of transmission units 311 included in the optical transmission block 302 can respectively transmit optical signals from the light sources for optical communication 313 to a plurality of reception units 312 included in an optical reception block 303 of a different optical communication chip 301 to be a communication partner. Also, in the optical communication chip 301, the plurality of reception units 312 included in the optical reception block 303 can respectively receive, with the light receiving elements 314, optical signals transmitted from a plurality of transmission units 311 included in an optical transmission block 302 of a different optical communication chip 301 to be a communication partner.

Also, each of the transmission units 311 includes an input buffer circuit 41, an LDD 42, and a laser diode monitoring circuit 327. The input buffer circuit 41 includes a waveform shaping circuit 43 and an amplifier circuit 44.

The input buffer circuit 41, the LDD 42, the waveform shaping circuit 43, and the amplifier circuit 44 are configured in a manner similar to those of the optical transmission circuit 22 illustrated in FIG. 2. The laser diode monitoring circuit 327 monitors the light sources for optical communication 313 and stops outputting a current signal from the LDD 42 to the light sources for optical communication 313 when a trouble is detected in the light sources for optical communication 313.

Also, each of the reception unit 312 includes a received signal strength indicator (RSSI) 331, a transimpedance amplifier 332, a limiting amplifier 333, and an output buffer 334.

The signal strength indicator circuit 331 measures the strength of a single-end current signal supplied from the light receiving element 314 to the transimpedance amplifier 332.

The transimpedance amplifier 332 removes a DC component of the single-end current signal supplied from the light receiving element 314, converts the single-end current signal into a differential signal, and outputs the differential signal.

The limiting amplifier 333 amplifies the differential signal output from the transimpedance amplifier 332 to a predetermined level which is set in advance and outputs the amplified signal. The output buffer 334 temporary keeps the differential signal output from the limiting amplifier 333 and supplies, through a signal line, the differential signal to the signal processing circuit to process a received signal.

In such a manner, in the optical communication chip 301, the plurality of transmission units 311 includes the optical transmission circuit 22 of each example configuration described above. In the optical communication chip 301, a plurality of optical transmission circuits 22 is arranged. That is, in the optical communication chip 301, the light sources for optical communication 313 can be driven in parallel in the plurality of optical transmission circuits 22. Thus, in a transmission/reception device including the optical communication chip 301 and an optical transmission system including the transmission/reception device, as described above, an optical signal can be output with low electric power consumption when driving to transmit the optical signal in parallel in the optical transmission block 302. Thus, heat generation in the optical communication chip 301 can be controlled. Also, in the optical communication chip 301, a voltage drop of a power supply can be prevented and an influence on optical communication due to the heat can be controlled. Also, the optical communication chip 301 can reduce crosstalk between adjoining transmission units 311 and crosstalk between adjoining reception units 312, and thus, it is possible to perform communication with less noise. Note that the optical transmission block 302 and the optical reception block 303 may be configured independently from the optical communication chip 301. The optical transmission device 12 (FIG. 1) may include the optical transmission block 302.

The present technique can also be in the following forms.

(1)

An optical transmission circuit including: a driving element configured to perform driving according to a level of a voltage signal to be transmitted optically; a modulation current driving circuit configured to supply a modulation current modulated by the driving element to a light source for optical communication configured to convert a current signal into light and to output the light; and a constant current supply circuit configured to supply a constant current to the light source for optical communication, wherein when the voltage signal is at a first level, the driving element is turned on and the modulation current driving circuit supplies the modulation current to the light source for optical communication, and when the voltage signal is at a second level, the driving element is turned off and the modulation current driving circuit stops supplying the modulation current.

(2)

The optical transmission circuit according to (1), further including a control circuit configured to change a value of a voltage supplied to one terminal of the driving element into an arbitrary value, wherein the control circuit is configured to perform adjustment in such a manner that an optimal modulation current which matches a characteristic of the light source for optical communication is supplied to the light source for optical communication from the modulation current driving circuit.

(3)

The optical transmission circuit according to (1) or (2), further including a driving circuit including the modulation current driving circuit and the constant current supply circuit, and an input buffer configured to transmit a signal to the driving circuit, wherein the input buffer is configured by connecting a second inverter, which includes an additional capacity and a feedback resistance, to an output of a first inverter.

(4)

The optical transmission circuit according to (3), wherein each of the first inverter and the second inverter which configure the input buffer is a CMOS inverter.

(5)

The optical transmission circuit according to (3), wherein each of the first inverter and the second inverter which configure the input buffer is a cascode-type CMOS inverter.

(6)

The optical transmission circuit according to any of (1) to (5), further including a voltage regulator configured to control a voltage of a terminal, the voltage signal of which is supplied to the driving element of the modulation current driving circuit, in order to supply an intended modulation current to the light source for optical communication.

(7)

The optical transmission circuit according to any of (1) to (6), further including a changing unit configured to change a signal amplification amount of the voltage signal supplied to the driving element of the modulation current driving circuit.

(8) An optical transmission device including: an optical transmission circuit configured to convert a voltage signal to be transmitted optically into a current signal; and a light source for optical communication configured to convert the current signal supplied from the optical transmission circuit into light and to output the light, wherein the optical transmission circuit includes a driving element configured to perform driving according to a level of the voltage signal to be transmitted optically, a modulation current driving circuit configured to supply a modulation current modulated by the driving element to the light source for optical communication configured to convert a current signal into light and to output the light, and a constant current supply circuit configured to supply a constant current to the light source for optical communication, and wherein when the voltage signal is at a first level, the driving element is turned on and the modulation current driving circuit supplies the modulation current to the light source for optical communication, and when the voltage signal is at a second level, the driving element is turned off and the modulation current driving circuit stops supplying the modulation current.

(9) The optical transmission device according to (9), wherein a plurality of optical transmission circuits is arranged therein and it is possible to convert voltage signals into current signals in parallel in each of the optical transmission circuits.

(10) An optical transmission system including: an optical transmission device including an optical transmission circuit configured to convert a voltage signal to be transmitted optically into a current signal and a light source for optical communication configured to convert the current signal supplied from the optical transmission circuit into light and to output the light; and an optical reception device including a light receiving element configured to receive the optical signal through an optical transmission path and to output a current signal which is the optical signal being converted photoelectrically and an optical reception circuit configured to perform voltage conversion on the current signal output from the light receiving element, wherein the optical transmission circuit includes a driving element configured to perform driving according to a level of the voltage signal to be transmitted optically, a modulation current driving circuit configured to supply a modulation current modulated by the driving element to the light source for optical communication configured to convert a current signal into light and to output the light, and a constant current supply circuit configured to supply a constant current to the light source for optical communication, and wherein when the voltage signal is at a first level, the driving element is turned on and the modulation current driving circuit supplies the modulation current to the light source for optical communication, and when the voltage signal is at a second level, the driving element is turned off and the modulation current driving circuit stops supplying the modulation current.

(11) The optical transmission system according to (10), wherein in the optical reception device, a plurality of optical transmission circuits is arranged and it is possible to convert voltage signals into current signals in parallel in each of the optical transmission circuits. It should be noted that the present embodiments are not limited to the above described embodiments, and various modifications may be made without departing from the scope of the present disclosure.

REFERENCE SIGNS LIST 11 optical transmission system
12 optical transmission device
13 optical transmission path
14 optical reception device
15 optical transmission module
21 signal processing circuit
22 optical transmission circuit
23 light source for optical communication
31 light receiving element
32 optical reception circuit
33 signal processing circuit
41 input buffer circuit
42 LDD
51 current-voltage conversion circuit
52 signal amplifier circuit
53 output buffer circuit
101 constant current supply circuit
102 PMOS driver
103 voltage regulator
104 control circuit
105 transistor
106 transistor
111 variable current source
112 low drop out constant regulator
113 resistance
121 inverter
122 feedback resistance
123 capacitor
141 PMOS-type transistor
142 NMOS-type transistor
151 PMOS-type transistor
152 NMOS-type transistor
153 PMOS-type transistor
154 NMOS-type transistor
161 bias regulator
162 capacitor
163 resistance
171 amplifier

The invention claimed is:

1. An optical transmission circuit comprising:
   a driver that is controllable by data to transition a modulation current between a first level and a second level, an output terminal of the driver is configured to output the modulation current;
   a constant current supply circuit configured to produce a constant current that is unchanging throughout a transmission of the data, an output terminal of the constant current supply circuit is configured to output the constant current; and
   a light source configured to convert a driving current into light, the output terminal of the constant current supply circuit and the output terminal of the driver are electrically connected to an input terminal of the light source,
   wherein the driver is a transistor, and
   wherein a gate electrode of the transistor is configured to receive a signal output from an input buffer circuit, the signal controls the driver transition the modulation current between the first level and the second level.

2. The optical transmission circuit according to claim 1, wherein the first level is a voltage level and the second level is a voltage level that differs from the first level.

3. The optical transmission circuit according to claim 1, wherein the driving current is the constant current when the modulation current is at the second level.

4. The optical transmission circuit according to claim 1, wherein the driving current is larger than the constant current when the modulation current is at the first level.

5. The optical transmission circuit according to claim 1, wherein the driving current is larger when the modulation current is at the first level than when the modulation current is at the second level.

6. The optical transmission circuit according to claim 1, wherein the modulated signal superimposed on the constant current during the transmission is the driving current.

7. The optical transmission circuit according to claim 1, wherein the transistor is a PMOS transistor.

8. The optical transmission circuit according to claim 1, wherein the input buffer circuit includes a cascade-type CMOS inverter.

9. The optical transmission circuit according to claim 1, wherein the light source is a diode.

10. The optical transmission circuit according to claim 9, wherein the input terminal of the light source is an anode of the diode.

11. The optical transmission circuit according to claim 1, wherein the output terminal of the constant current supply circuit is electrically connected directly to the input terminal of the light source.

12. The optical transmission circuit according to claim 1, wherein the output terminal of the driver is electrically connected directly to the input terminal of the light source.

13. An optical transmission device comprising:
a plurality of optical transmission circuits, the optical transmission circuit according to claim 1 is one of the optical transmission circuits.

14. An optical transmission system comprising:
the optical transmission circuit according to claim 1; and
an optical reception device that is configured to receive an optical signal from the optical transmission circuit.

15. The optical transmission system according to claim 14, wherein the light from the light source is the optical signal.

* * * * *